(12) United States Patent
Ariyoshi et al.

(10) Patent No.: US 11,834,049 B2
(45) Date of Patent: Dec. 5, 2023

(54) METHOD AND DEVICE FOR CONTROLLING HYBRID VEHICLE

(71) Applicant: Nissan Motor Co., Ltd., Kanagawa (JP)

(72) Inventors: Tomohiro Ariyoshi, Kanagawa (JP); Satomi Eto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 233 days.

(21) Appl. No.: 16/772,990

(22) PCT Filed: Dec. 15, 2017

(86) PCT No.: PCT/JP2017/045117
§ 371 (c)(1),
(2) Date: Jun. 15, 2020

(87) PCT Pub. No.: WO2019/116538
PCT Pub. Date: Jun. 20, 2019

(65) Prior Publication Data
US 2020/0391742 A1    Dec. 17, 2020

(51) Int. Cl.
*B60W 10/06*    (2006.01)
*B60W 30/182*   (2020.01)
(Continued)

(52) U.S. Cl.
CPC .......... *B60W 30/182* (2013.01); *B60W 10/06* (2013.01); *B60W 10/08* (2013.01);
(Continued)

(58) Field of Classification Search
CPC ...... B60W 10/06; B60W 10/08; B60W 10/26; B60W 30/182; B60W 30/1882; B60W 20/15
See application file for complete search history.

(56) References Cited

U.S. PATENT DOCUMENTS

| | | | | |
|---|---|---|---|---|
| 5,218,540 A | * | 6/1993 | Ishikawa | ................. F16H 61/47 701/60 |
| 8,380,419 B2 | * | 2/2013 | Sauter | ................. B60W 30/143 701/93 |

(Continued)

FOREIGN PATENT DOCUMENTS

| | | |
|---|---|---|
| JP | 2000-224711 A | 8/2000 |
| JP | 2005-061278 A | 3/2005 |

(Continued)

OTHER PUBLICATIONS

International Search Report issued in Application No. PCT/JP2017/045117, dated Feb. 6, 2018 (5 pages).

(Continued)

*Primary Examiner* — Gonzalo Laguarda
(74) *Attorney, Agent, or Firm* — Osha Bergman Watanabe & Burton LLP

(57) ABSTRACT

A method for controlling a hybrid vehicle (1) is provided. The hybrid vehicle includes an electric motor (13) that drives the vehicle to travel, a generator (12) that supplies power to the electric motor, and an engine (11) that drives the generator. The method includes calculating an amount or factor of change in target driving force (Fd) for the vehicle, setting a change rate (NRu, NRd) of a rotational speed of the engine in accordance with the amount or factor of change in the target driving force, and controlling the rotational speed of the engine on the basis of the change rate of the rotational speed of the engine.

10 Claims, 11 Drawing Sheets

(51) Int. Cl.
*B60W 20/15* (2016.01)
*B60W 10/08* (2006.01)
*B60W 10/26* (2006.01)
*B60W 30/188* (2012.01)

(52) U.S. Cl.
CPC ............ *B60W 10/26* (2013.01); *B60W 20/15* (2016.01); *B60W 30/1882* (2013.01); *B60W 2510/0638* (2013.01); *B60W 2510/081* (2013.01); *B60W 2520/105* (2013.01)

(56) References Cited

U.S. PATENT DOCUMENTS

| | | | | |
|---|---|---|---|---|
| 8,818,604 | B2* | 8/2014 | Tagawa | B60W 20/00 701/22 |
| 9,174,640 | B2* | 11/2015 | Dlugoss | B60K 6/48 |
| 9,346,458 | B2* | 5/2016 | Ohkuma | B60K 6/445 |
| 9,457,798 | B2* | 10/2016 | Futatsudera | B60W 10/26 |
| 9,487,932 | B2* | 11/2016 | Ishihara | B60L 50/16 |
| 9,816,252 | B2* | 11/2017 | Hoshino | F02D 29/02 |
| 2007/0032926 | A1 | 2/2007 | Kozarekar et al. | |
| 2013/0311024 | A1 | 11/2013 | Tagawa et al. | |
| 2021/0039628 | A1* | 2/2021 | Tabata | B60W 10/08 |
| 2021/0162979 | A1* | 6/2021 | Ariyoshi | B60W 10/08 |
| 2021/0162983 | A1* | 6/2021 | Ariyoshi | B60W 10/08 |

FOREIGN PATENT DOCUMENTS

| | | |
|---|---|---|
| JP | 3997633 B2 | 10/2007 |
| WO | 2012/104922 A1 | 8/2012 |

OTHER PUBLICATIONS

Written Opinion issued in International Publication No. PCT/JP2017/045117, dated Feb. 6, 2018 (4 pages).

International Preliminary Report on Patentability issued in International Application No. PCT/JP2017/045117, dated Jun. 28, 2018 (11 pages).

* cited by examiner

METHOD AND DEVICE FOR CONTROLLING HYBRID VEHICLE

TECHNICAL FIELD

The present invention relates to a method and a device for controlling a hybrid vehicle.

BACKGROUND ART

In hybrid vehicles, a control device that includes an engine target driving force setting means and a target value setting means is known (Patent Document 1). The engine target driving force setting means calculates target driving force of the engine through dividing required horsepower from a battery by the vehicle speed to obtain a quotient and subtracting the quotient from the target driving force for the vehicle. The target value setting means obtains an operating point of the engine at which the fuel consumption is optimum, on the basis of the target driving force of the engine and sets target engine torque and a target input shaft rotational speed of an automatic transmission using the operating point. The target value setting means calculates the target input shaft rotational speed on the basis of a characteristic curve or a map of the vehicle speed and the input shaft rotational speed with respect to driving force that is preliminarily set.

PRIOR ART DOCUMENT

Patent Document

[Patent Document 1] JP3997633B

SUMMARY OF INVENTION

Problems to be Solved by Invention

When the rotational speed of the engine is unexceptionally determined with respect to the driving force of a driving electric motor as in the above prior art, unfortunately, the rotational speed of the engine may rapidly increase upon acceleration with depression of the accelerator pedal because the responsiveness of the rotational speed of the driving electric motor to the accelerator pedal position is higher than the responsiveness of the engine. Accordingly, the acceleration feel perceived from the engine sound differs from the driver's intention to accelerate, and a sudden uncomfortable feeling may thus be given to the driver. Likewise, also when releasing the accelerator pedal to decelerate, the rotational speed of the engine may rapidly decrease; therefore, the deceleration feel perceived from the engine sound differs from the driver's intention to decelerate, and a sudden uncomfortable feeling may thus be given to the driver. Such an uncomfortable feeling is particularly noticeable in a so-called series hybrid vehicle in which the engine is used for power generation for the driving electric motor.

A problem to be solved by the present invention is to provide a method and a device for controlling a hybrid vehicle that are able to alleviate the uncomfortable feeling given to the driver.

Means for Solving Problems

The present invention provides a method for controlling a hybrid vehicle comprising an electric motor that drives the vehicle to travel, a generator that supplies power to the electric motor, and an engine that drives the generator, the method comprising: calculating an amount or factor of change in target driving force for the vehicle; setting a change rate of a rotational speed of the engine in accordance with the amount or factor of change in the target driving force; and controlling the rotational speed of the engine on a basis of the change rate of the rotational speed of the engine, wherein the rotational speed of the engine is controlled based on the change rate of the rotational speed of the engine in accordance with the amount or factor of change in the target driving force from a time point at which the amount or factor of change in the target driving force becomes a predetermined threshold or more until a second predetermined time elapses, and after the second predetermined time has elapsed, the rotational speed of the engine is controlled based on a predetermined constant engine rotational speed change rate. And the present invention provides a method for controlling a hybrid vehicle comprising an electric motor that drives the vehicle to travel, a generator that supplies power to the electric motor, and an engine that drives the generator, the method comprising: calculating target driving force for the vehicle; and controlling a rotational speed of the engine in accordance with pseudo driving force and latch pseudo driving force, the pseudo driving force gradually approaching the target driving force until after a first predetermined time with a time delay with respect to the target driving force, the latch pseudo driving force being the pseudo driving force at a time point at which an amount or factor of change in the target driving force becomes a predetermined threshold or more.

Effect of Invention

According to the present invention, rather than unexceptionally setting the rotational speed of the engine with respect to the target driving force for the vehicle, the change rate of the rotational speed of the engine is determined in accordance with the amount or factor of change in the target driving force and control is performed based on the change rate; therefore, even when the absolute value of the amount of change or the factor of change in the target driving force is large, rapid increase or decrease in the rotational speed of the engine can be suppressed. As a result, the uncomfortable feeling perceived by the driver, such as a sudden uncomfortable feeling, can be alleviated.

MODE(S) FOR CARRYING OUT THE INVENTION

«Mechanical Configuration of Hybrid Vehicle»

Figure 1:
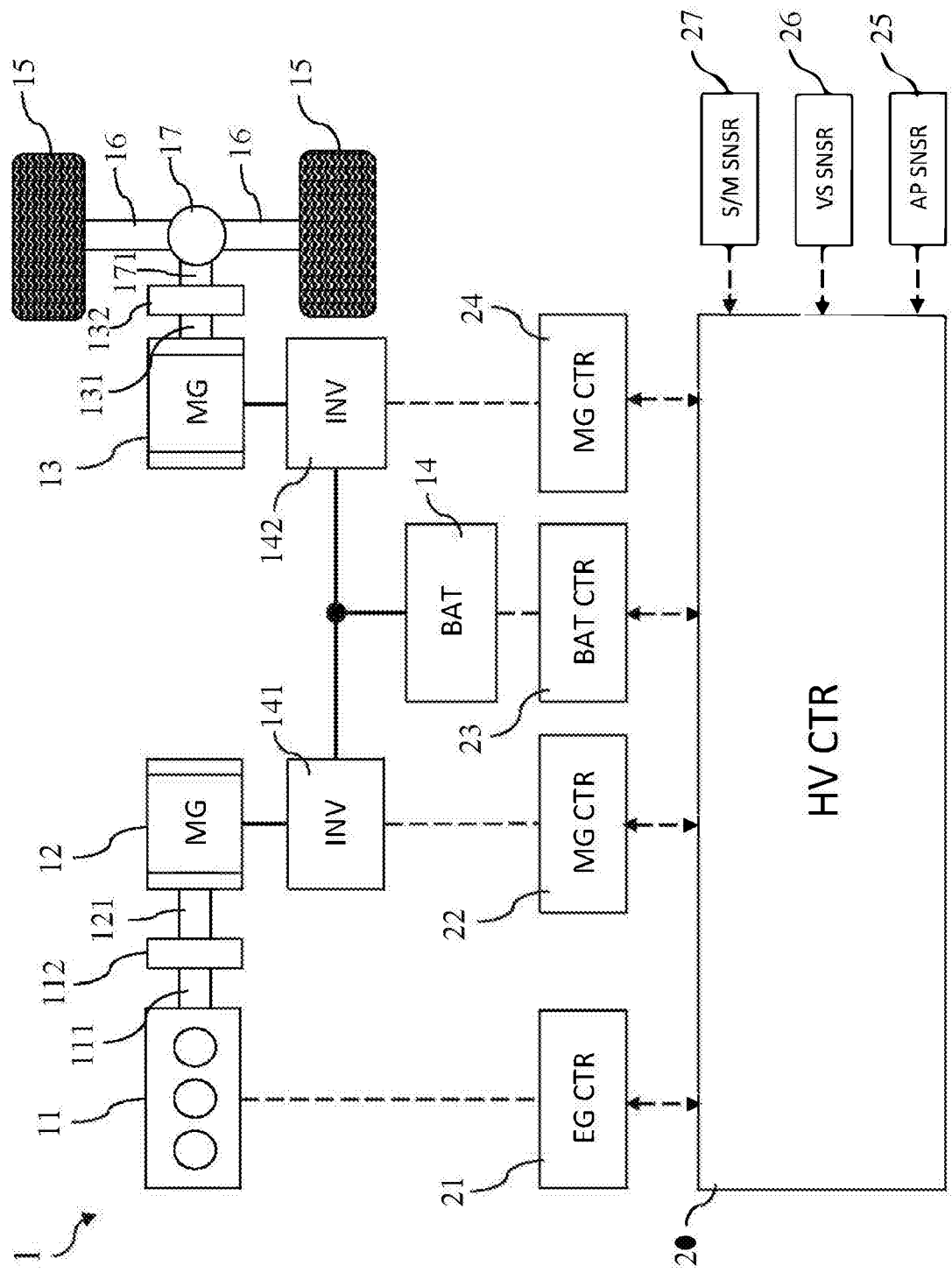
FIG. 1 is a block diagram illustrating an embodiment of a hybrid vehicle to which the method for controlling a hybrid vehicle according to the present invention is applied.

FIG. 1 is a block diagram illustrating an embodiment of a hybrid vehicle to which the method for controlling a hybrid vehicle according to the present invention is applied. Hybrid vehicle 1 of the present embodiment includes an engine 11, a generator 12, an electric motor 13, a battery 14, drive wheels 15 and 15, drive axles 16 and 16, and a differential gear 17. The hybrid vehicle 1 of the present embodiment is a vehicle in which the drive wheels 15 and 15 are driven only by the driving force of the electric motor 13 rather than by the driving force of the engine 11. This type of hybrid vehicle 1 is called a series hybrid vehicle in contrast to a parallel hybrid vehicle and a power-split hybrid vehicle because the engine 11, the electric motor 13, and the drive wheels 15 and 15 are connected in series (series connection).

The engine 11 of the present embodiment is controlled to start and stop with an engine torque command value that is input from an engine controller 21, which will be described later. The cranking at the time of starting is performed by the driving force from the generator 12 which is configured as a motor generator. Then, fuel injection control, air-intake amount control, ignition control, and other control of drive parameters of the engine 11 are executed in accordance with the engine torque command value, and the engine 11 is driven at a rotational speed determined in accordance with the engine torque command value. The engine 11 has an output shaft 111, which is mechanically connected to a rotating shaft 121 of the generator 12 via a speed-up gear 112. Thus, when the engine 11 is driven, the rotating shaft 121 of the generator 12 rotates in accordance with the speed increase ratio of the speed-up gear 112 (which may be a constant speed increase ratio or a variable speed increase ratio). As a result, the generator 12 generates electric power of a power generation amount corresponding to the rotational speed of the rotating shaft 121.

The engine 11 also serves as a load when discharging surplus power regenerated by the electric motor 13, which will be described later. For example, when the state of charge (SOC) of the battery 14 is a full charge state or a state close to the full charge state and it is desired to achieve motor brake by the electric motor 13, the electric power regenerated by the electric motor 13 is supplied to the generator 12, which serves as a motor generator. The surplus power can thus be discharged such that the generator 12 operates the engine 11 with no load, in which the fuel injection and ignition are stopped.

The generator 12 of the present embodiment serves not only as a generator but also as a motor (electric motor) through the switching control performed by a first inverter 141. The generator 12 serves as a motor when performing the above-described cranking operation at the time of start of the engine 11 or process of discharging surplus power from the electric motor 13. It suffices, however, that the generator 12 serves at least as a generator in order to realize the method and device for controlling a hybrid vehicle according to the present invention.

The generator 12 of the present embodiment is electrically connected to the battery 14 via the first inverter 141 so that electric power can be transmitted and received. In addition, the generator 12 of the present embodiment is electrically connected to the electric motor 13 via the first inverter 141 and a second inverter 142 so that electric power can be transmitted and received. The first inverter 141 converts AC power generated by the generator 12 into DC power and supplies the DC power to the battery 14 and/or the second inverter 142. The first inverter 141 also converts DC power supplied from the battery 14 and/or the second inverter 142 into AC power and supplies the AC power to the generator 12. The first inverter 141 and the generator 12 are controlled by a rotational speed command value from a generator controller 22, which will be described later.

The battery 14 of the present embodiment, which is composed of a secondary battery such as a lithium ion battery, receives and stores the electric power generated by the generator 12 via the first inverter 141 and also receives and stores the electric power regenerated by the motor 13 via the second inverter 142. Although illustration is omitted, the battery 14 may also be configured to be charged from an external commercial power supply. The battery 14 of the present embodiment supplies the stored electric power to the electric motor 13 via the second inverter 142 to drive the electric motor 13. The battery 14 of the present embodiment also supplies the stored electric power to the generator 12, which serves as a motor, via the first inverter 141 to drive the generator 12 and executes the cranking of the engine 11, the operation of the engine with no load, etc. The battery 14 is monitored by a battery controller 23, which executes charge/discharge control in accordance with the state of charge SOC. With regard to the power supply source to the electric motor 13 of the present embodiment, the battery 14 may be used as a main power source while the generator 12 may be used as a sub power source, or the generator 12 may be used as a main power source while the battery 14 may be used as a sub power source. To realize the method and device for controlling a hybrid vehicle according to the present invention, the battery 14 as illustrated in FIG. 1 is not necessarily required, and the battery 14 may be omitted as necessary, provided that a battery for cranking the engine 11 is provided and the rated generated power of the generator 12 is sufficiently large for the hybrid vehicle 1 to travel.

The electric motor 13 of the present embodiment has a rotating shaft 131, which is connected to a gear input shaft 171 of the differential gear 17 via a speed-down gear 132. The rotation torque of the rotating shaft 131 of the electric motor 13 is transmitted to the speed-down gear 132 and the differential gear 17. The differential gear 17 divides the rotation torque into right and left components, which are respectively transmitted to the right and left drive wheels 15 and 15 via the right and left drive axles 16 and 16. This allows the drive wheels 15 and 15 to rotate in accordance with the drive torque of the electric motor 13, and the hybrid vehicle 1 moves forward or backward. The speed reduction ratio of the speed-down gear 132 may be a fixed reduction ratio or may also be a variable reduction ratio. For example, a transmission may be provided as substitute for the speed-down gear 132.

A shift lever switch sensor/travel mode switch sensor 27 is provided (which will be also referred to as an S/M sensor 27, hereinafter). The S/M sensor 27 includes a shift lever switch sensor, which detects a shift lever switch. The shift lever switch is a lever-type switch that can select any one of a neutral position, a parking position, a drive position, a reverse position, and a brake position. The shift lever switch is generally installed on the center console or the like next to the driver seat. When the drive position is selected, the electric motor 13 rotates in the direction corresponding to the forward direction of the vehicle, and when the reverse position is selected, the electric motor 13 rotates reversely in the direction corresponding to the backward direction of the vehicle. The brake position refers to a position at which the target regenerative driving force of the electric motor 13 with respect to the traveling speed is set larger, and when the accelerator pedal is released, the electric motor 13 achieves the motor brake which is large enough to stop the hybrid vehicle 1 without a brake operation. The S/M sensor 27 further includes a travel mode switch sensor, which detects a travel mode switch. The travel mode switch refers, for example, to a button-type or dial-type switch for switching among a plurality of travel modes, such as a normal travel mode, an eco-travel mode, and a sports travel mode, in which profiles of the target driving force with respect to the vehicle speed and the accelerator pedal position are different (the travel modes will be described later with reference to FIG. 3). The travel mode switch is generally installed on the center console or the like next to the driver seat. The travel mode can be set when the shift lever switch is set to the drive position or the brake position.

The electric motor 13 of the present embodiment serves not only as a motor but also as a generator (electric generator) through the switching control performed by the second inverter 142. The electric motor 13 serves as a generator when charging the above-described battery 14 in the case of a low state of charge SOC or when it is desired to achieve the motor brake during deceleration. It suffices, however, that the electric motor 13 serves at least as an electric motor in order to realize the method and device for controlling a hybrid vehicle according to the present invention.

The electric motor 13 of the present embodiment is electrically connected to the battery 14 via the second inverter 142 so that electric power can be transmitted and received. In addition, the electric motor 13 of the present embodiment is electrically connected to the generator 12 via the first inverter 141 and the second inverter 142 so that electric power can be transmitted and received. The second inverter 142 converts DC power supplied from the battery 14 and/or the first inverter 141 into AC power and supplies the AC power to the electric motor 13. The second inverter 142 also converts AC power generated by the electric motor 13 into DC power and supplies the DC power to the battery 14 and/or the first inverter 141. The second inverter 142 and the electric motor 13 are controlled by a drive torque command value from an electric motor controller 24, which will be described later.

As described above, in the hybrid vehicle 1 of the present embodiment, when the driver depresses the accelerator pedal after turning on the power switch and releasing the side brake, the required drive torque corresponding to the depression amount of the accelerator pedal is calculated by a vehicle controller 20. The drive torque command value is output to the second inverter 142 and the electric motor 13 via the electric motor controller 24, and the electric motor 13 is driven to generate the torque corresponding to the drive torque command value. This allows the drive wheels 15 and 15 to rotate, and the hybrid vehicle 1 travels. In this operation, a determination is made as to whether or not to drive the engine 11, on the basis of the input values from an accelerator sensor 25, a vehicle speed sensor 26, and the S/M sensor 27 and the state of charge SOC of the battery 14 monitored by the battery controller 23, and when the necessary conditions are satisfied, the hybrid vehicle 1 travels while driving the engine 11. The configuration of a control system will be described below, including the drive control for the engine 11.

《Configuration of Control System for Hybrid Vehicle》

Figure 2:
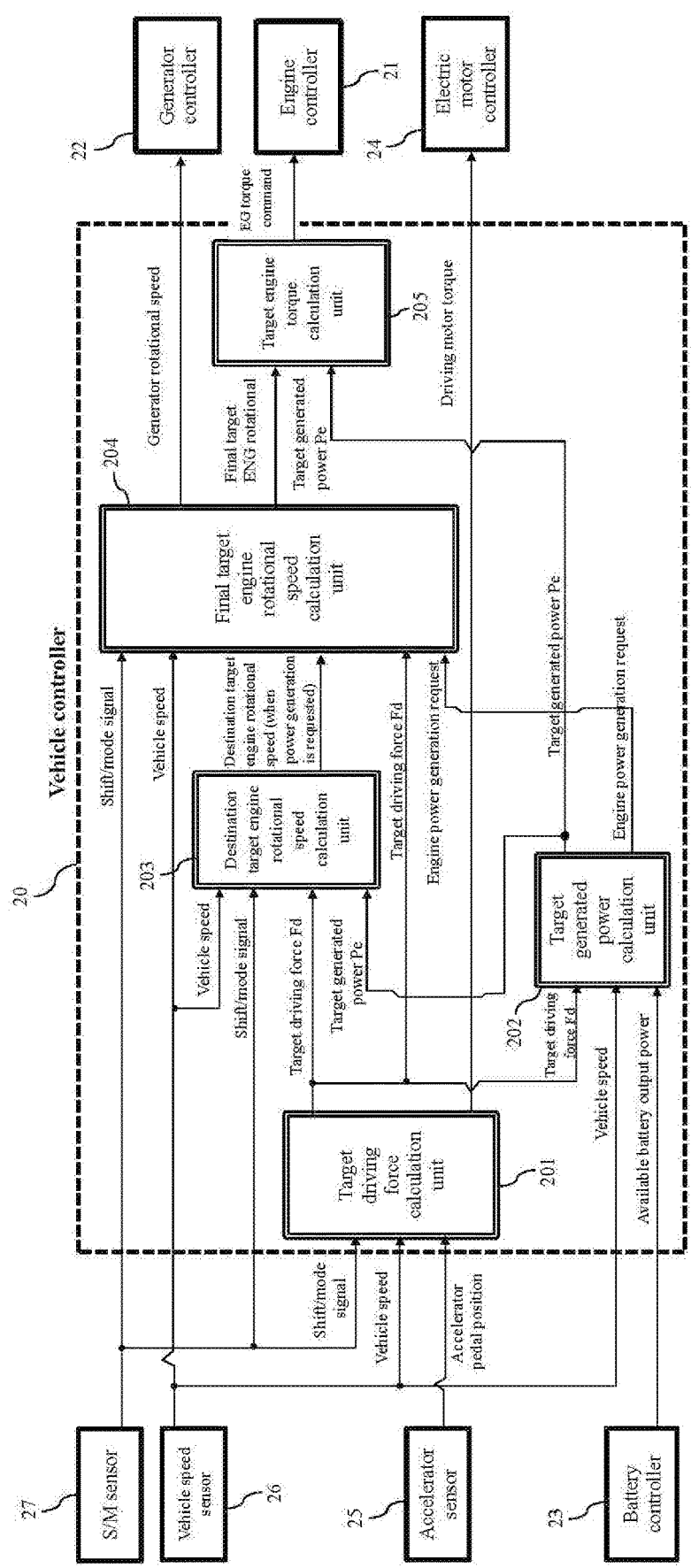
FIG. 2 is a control block diagram illustrating the main configuration of a control system for the hybrid vehicle of FIG. 1.

FIG. 2 is a control block diagram illustrating a main configuration of the control system for the hybrid vehicle 1 of the present embodiment illustrated in FIG. 1. As illustrated in FIG. 2, the control system of the present embodiment includes the battery controller 23, accelerator sensor 25, vehicle speed sensor 26, and S/M sensor 27 as input elements and the engine controller 21, generator controller 22, and electric motor controller 24 as output target elements. Respective signals from the input elements are processed by the vehicle controller 20 and output as control signals to the output target elements.

The battery controller 23 as an input element calculates the current available battery output power (W) from the current state of charge SOC (e.g., 0% to 100%) and the rated output power of the battery 14 to be monitored and outputs the calculated current available battery output power (W) to a target generated power calculation unit 202. The accelerator sensor 25 as an input element detects a depression amount of the accelerator pedal which the driver depresses and releases, and outputs the detected depression amount as an accelerator pedal position (e.g., 0% to 100%) to a target driving force calculation unit 201. The vehicle speed sensor 26 as an input element calculates the vehicle speed, for example, from the rotational speed of the rotating shaft 131 of the electric motor 13, the speed reduction ratio of the speed-down gear 132, and the radius of the drive wheels 15 and outputs the calculated vehicle speed to the target driving force calculation unit 201, the target generated power calculation unit 202, a destination target engine rotational speed calculation unit 203, and a final target engine rotational speed calculation unit 204. The S/M sensor 27 as an input element outputs a shift signal and a mode signal to the target driving force calculation unit 201, the destination target engine rotational speed calculation unit 203, and the final target engine rotational speed calculation unit 204. The shift signal is selected by the above-described shift lever switch (any one of the neutral position, parking position, drive position, reverse position, and brake position). The mode signal is selected by the above-described travel mode switch (any one of the normal travel mode, eco-travel mode, and sports travel mode).

A target engine torque calculation unit 205 is provided, which calculate an engine torque command value. The engine torque command value is input to the engine controller 21 as an output target element. On the basis of the engine torque command value, the engine controller 21 controls the drive parameters of the engine 11, such as the air-intake amount, fuel injection amount, and ignition of the engine 11, to control the driving of the engine 11. The final target engine rotational speed calculation unit 204 calculates a generator rotational speed command value, which is input to the generator controller 22 as an output target element. On the basis of the generator rotational speed command value, the generator controller 22 controls the electric power supplied to the generator 12. The generator rotational speed command value is an operation command value for the generator 12 connected to the engine 11. The target driving force calculation unit 201 calculates a driving motor torque command value, which is input to the electric motor controller 24 as an output target element. The electric motor controller 24 controls the electric power supplied to the electric motor 13. The driving motor torque command value is a main command value for controlling the hybrid vehicle 1 to travel in accordance with the driver's accelerator operation.

The configuration of the vehicle controller 20 will then be described. The vehicle controller 20 processes respective signals from the above-described input elements and outputs control signals to the output target elements. The vehicle controller 20 of the present embodiment includes the target driving force calculation unit 201, the target generated power calculation unit 202, the destination target engine rotational speed calculation unit 203, the final target engine rotational speed calculation unit 204, and the target engine torque calculation unit 205.

The vehicle controller 20 is configured as a computer installed with hardware and software. More specifically, the vehicle controller 20 is configured to include a read only memory (ROM) that stores programs, a central processing unit (CPU) that executes the programs stored in the ROM, and a random access memory (RAM) that serves as an accessible storage device. A micro processing unit (MPU), a digital signal processor (DSP), an application specific integrated circuit (ASIC), a field programmable gate array (FPGA), or the like can be used as an operation circuit as substitute for or in addition to the CPU. The above-described target driving force calculation unit 201, target generated power calculation unit 202, destination target engine rotational speed calculation unit 203, final target engine rotational speed calculation unit 204, and target engine torque calculation unit 205 achieve respective functions, which will be described later, by the software established in the ROM. Likewise, the engine controller 21, generator controller 22, and electric motor controller 24 as the output target elements and the battery controller 23 as the input element are each configured as a computer installed with hardware and software, that is, configured to include a ROM that stores programs, a CPU (or MPU, DSP, ASIC, or FPGA) that executes the programs stored in the ROM, and a RAM that serves as an accessible storage device.

Figure 3:
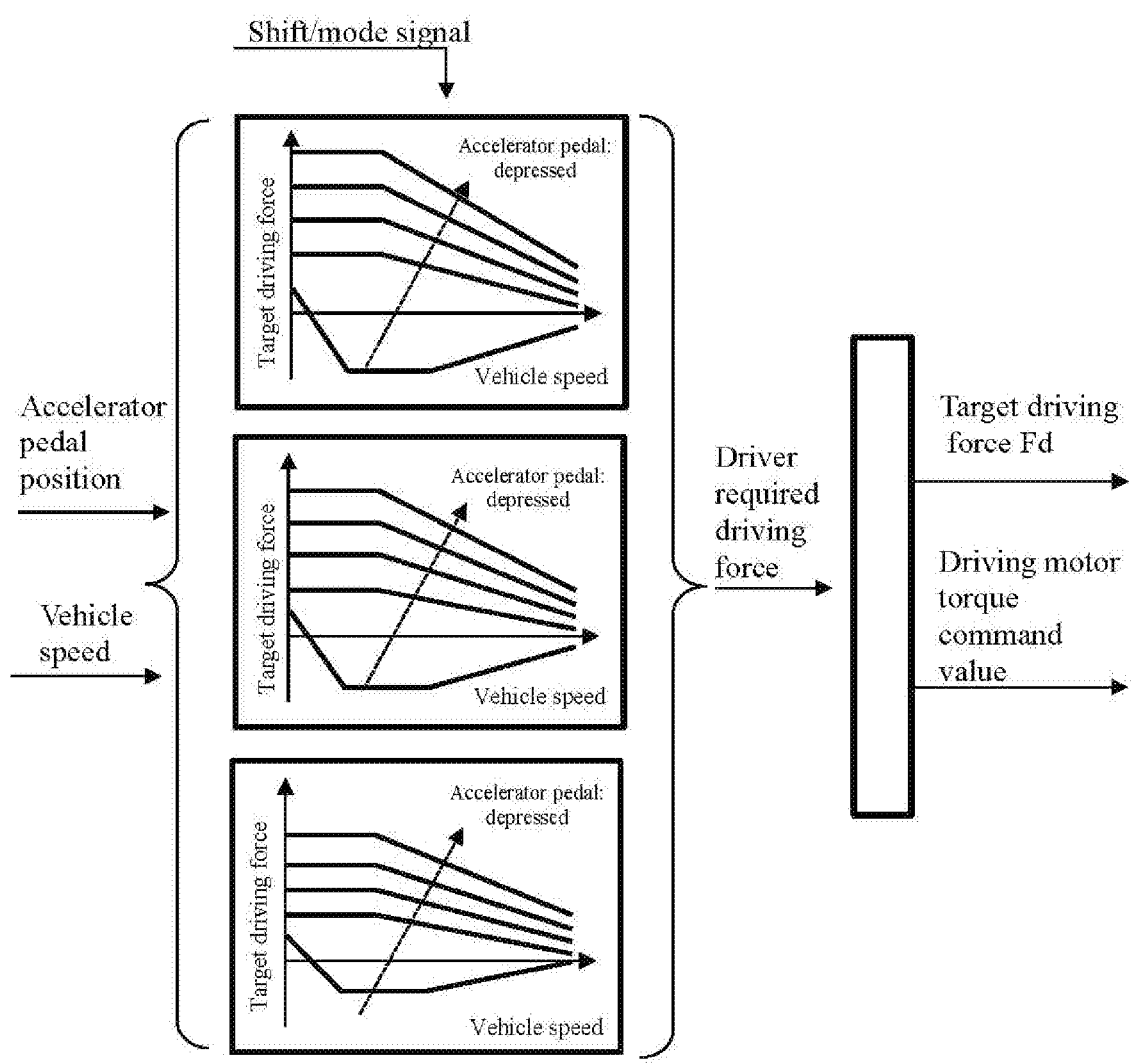
FIG. 3 is a control block diagram illustrating the main configuration of a target driving force calculation unit of FIG. 2.

FIG. 3 is a control block diagram illustrating a main configuration of the target driving force calculation unit 201 of FIG. 2. Respective signals of the accelerator pedal position from the accelerator sensor 25, the vehicle speed from the vehicle speed sensor 26, and the shift position and travel mode from the S/M sensor 27 are input to the target driving force calculation unit 201, which outputs target driving force Fd and the driving motor torque command value. The vehicle controller 20 includes a memory, which stores respective control maps in the three travel modes, that is, the sports travel mode, the normal travel mode, and the eco-travel mode, for each of the shift positions (drive position and brake position). FIG. 3 illustrates, from above downwards, examples of the control maps in the three travel modes of the sports travel mode, the normal travel mode, and the eco-travel mode when the drive position is selected. Likewise, the control maps in the three travel modes of the sports travel mode, the normal travel mode, and the eco-travel mode when the brake position is selected are also stored. The three travel modes corresponding to each shift position are different in the magnitude of the target driving force (vertical axis) with respect to the vehicle speed (horizontal axis) and the accelerator pedal position (multiple lines). In the sports travel mode, the target driving force with respect to the vehicle speed and the accelerator pedal position is set relatively large, while in the eco-travel mode, the target driving force with respect to the vehicle speed and the accelerator pedal position is set relatively small, or a medium value is set in the normal travel mode. The travel modes for each shift position correspond to the travel specifications of the present invention.

Respective signals of the shift position and travel mode from the S/M sensor 27 are input to the target driving force calculation unit 201, which extracts the control map in the travel mode corresponding to the shift position and extracts the corresponding target driving force in accordance with the accelerator pedal position from the accelerator sensor 25 and the vehicle speed from the vehicle speed sensor 26. This is used as the driver target driving force, which is converted in the unit into the target driving motor torque using the dynamic radius of the driving wheels 15 and the speed reduction ratio of the speed-down gear 132. Here, if the obtained target driving motor torque exceeds an upper limit torque value that is preliminarily set, the upper limit torque value is set as the target driving motor torque, while if the obtained target driving motor torque is less than a lower limit torque value that is preliminarily set, the lower limit torque value is set as the target driving motor torque value. Then, the target driving motor torque thus obtained is output as a driving motor torque command value to the electric motor 13. In addition, the target driving motor torque thus obtained is reconverted in the unit into the target driving force Fd using the dynamic radius of the drive wheels 15 and the speed reduction ratio of the speed-down gear 132, and the target driving force Fd is output to the target generated power calculation unit 202, the destination target engine rotational speed calculation unit 203, and the final target engine rotational speed calculation unit 204.

The target generated power calculation unit 202 of FIG. 2 multiplies the target driving force Fd from the target driving force calculation unit 201 by the vehicle speed from the vehicle speed sensor 26 to obtain the required driving power and subtracts the available battery output power, which is obtained from the battery controller 23, from the required driving power to obtain the basic target generated power. The generated power to be added as required (e.g., the required charging power obtained from the state of charge SOC of the battery 14) is added to the basic target generated power to obtain target generated power Pe. When the obtained target generated power Pe is larger than zero, the electric power exceeding the available battery output power of the battery 14 is required; therefore, the target generated power calculation unit 202 outputs an engine power generation request to the effect that the engine 11 should be driven for power generation by the generator 12. In contrast, when the obtained target generated power Pe is not larger than zero, the electric motor 13 can be driven by the power which does not exceed the available battery output power of the battery 14; therefore, the target generated power calculation unit 202 does not output the engine power generation request. The target generated power Pe calculated by the target generated power calculation unit 202 is output, as illustrated in FIG. 2, to the destination target engine rotational speed calculation unit 203 and the target engine torque calculation unit 205. In addition, the engine power generation request determined by the target generated power calculation unit 202 is output, for example, as a flag signal to the final target engine rotational speed calculation unit 204.

Figure 4:
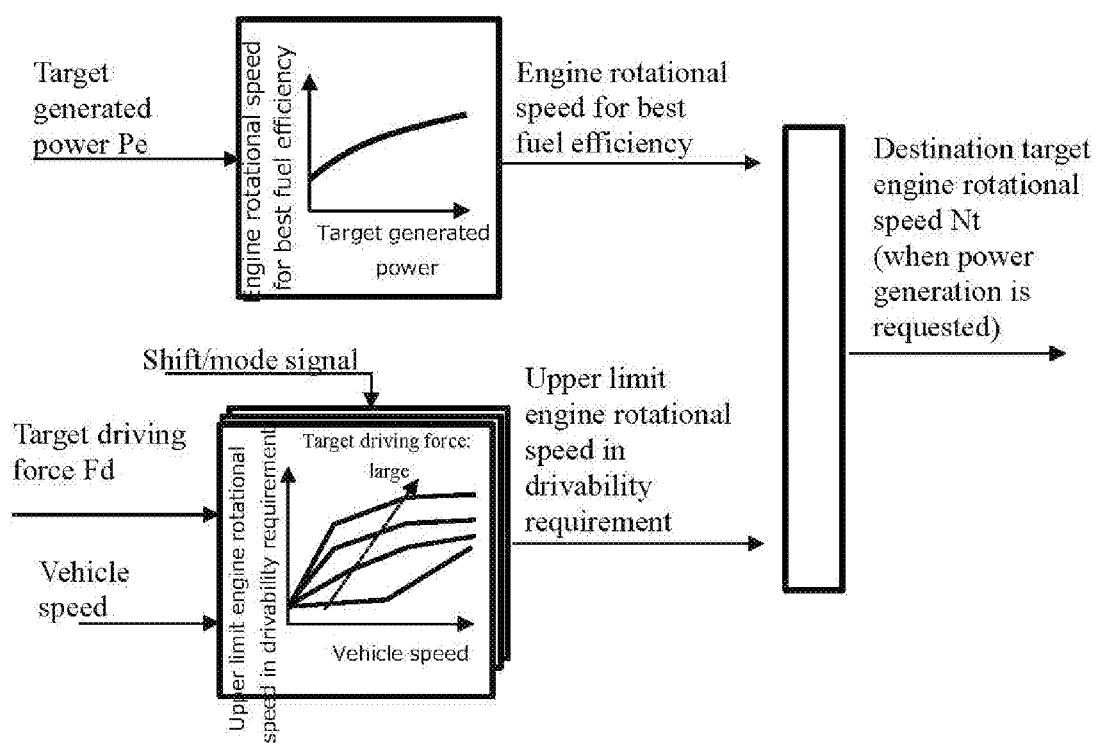
FIG. 4 is a control block diagram illustrating the main configuration of a destination target engine rotational speed calculation unit of FIG. 2.

FIG. 4 is a control block diagram illustrating a main configuration of the destination target engine rotational speed calculation unit 203 of FIG. 2. The vehicle controller 20 includes a memory, which stores a control map, as illustrated in FIG. 4, for the engine rotational speed at which the best fuel efficiency is obtained with respect to the target generated power Pe and a control map, as illustrated in FIG. 4, for the upper limit engine rotational speed in a drivability requirement with respect to the vehicle speed and the target driving force Fd. The target generated power Pe calculated by the target generated power calculation unit 202 is input to the destination target engine rotational speed calculation unit 203, which extracts the engine rotational speed at which the best fuel efficiency is obtained, with reference to the control map illustrated in FIG. 4 for the engine rotational speed at which the best fuel efficiency is obtained with respect to the target generated power Pe. In addition, respective signals of the shift position and travel mode from the S/M sensor 27 are input to the destination target engine rotational speed calculation unit 203, which extracts the control map for the upper limit engine rotational speed in the drivability requirement with respect to the corresponding vehicle speed and target driving force Fd and extracts the upper limit engine rotational speed in the corresponding drivability requirement in accordance with the accelerator pedal position from the accelerator sensor 25 and the vehicle speed from the vehicle speed sensor 26.

Then, the engine rotational speed at which the best fuel efficiency is obtained is compared with the upper limit engine rotational speed in the drivability requirement, and the engine rotational speed smaller than the other is extracted. When that rotational speed is less than the lower limit of the engine rotational speed, the lower limit of the engine rotational speed is set as a destination target engine rotational speed Nt, while when that rotational speed exceeds the upper limit of the engine rotational speed for protecting the engine 11, the upper limit of the engine rotational speed is set as the destination target engine rotational speed Nt. When that rotational speed is between the lower limit and upper limit of the engine rotational speed, that engine rotational speed is set without any change as the destination target engine rotational speed Nt. The destination target engine rotational speed Nt is output to the final target engine rotational speed calculation unit 204 as illustrated in FIG. 2. The calculation of the destination target engine rotational speed Nt in the destination target engine rotational speed calculation unit 203 is executed irrespective of whether or not the engine power generation request is output from the target generated power calculation unit 202, and the final target engine rotational speed calculation unit 204 may be configured to read the destination target engine rotational speed Nt.

Figure 5:
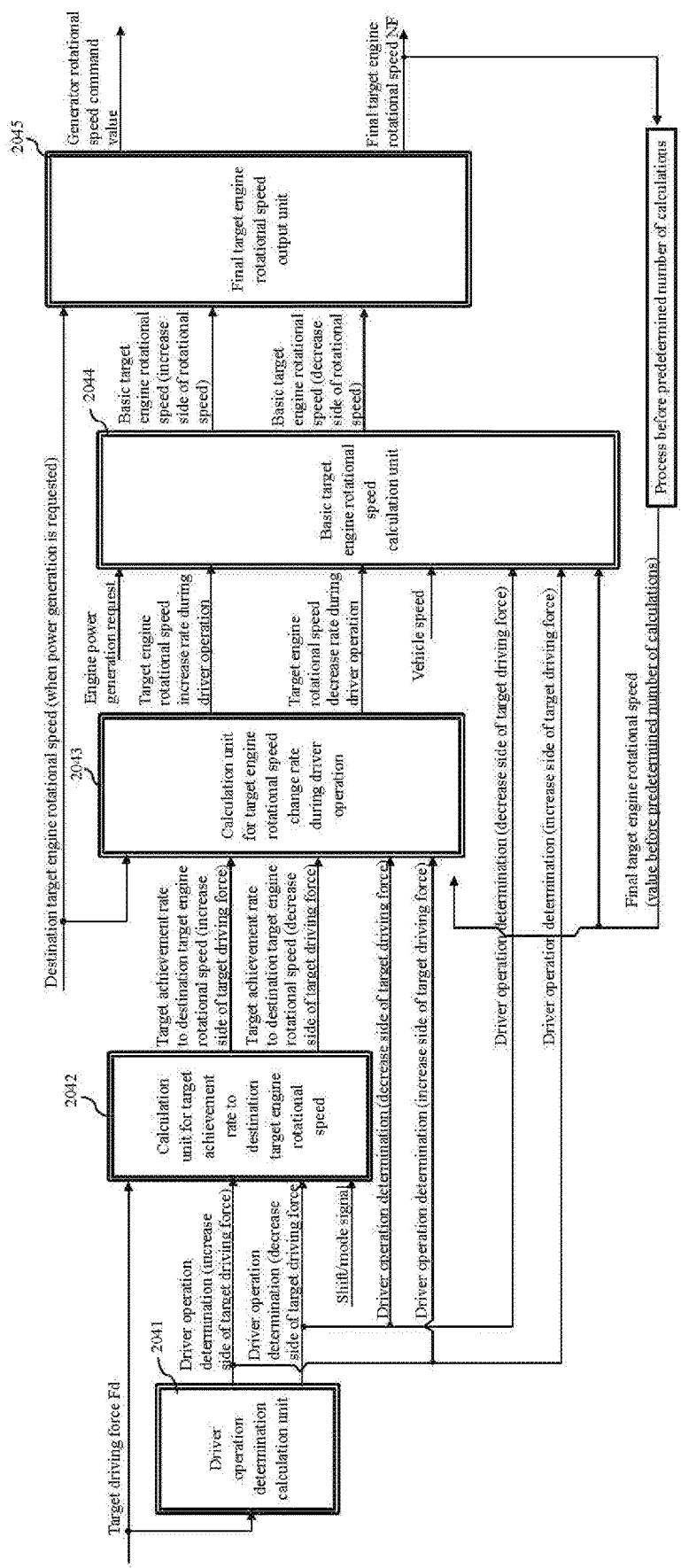
FIG. 5 is a control block diagram illustrating the main configuration of a final target engine rotational speed calculation unit of FIG. 2.

FIG. 5 is a control block diagram illustrating a main configuration of the final target engine rotational speed calculation unit 204 of FIG. 2. The final target engine rotational speed calculation unit 204 includes a driver operation determination calculation unit 2041, a calculation unit 2042 for a target achievement rate to the destination target engine rotational speed, a calculation unit 2043 for a target engine rotational speed change rate during the driver operation, a basic target engine rotational speed calculation unit 2044, and a final target engine rotational speed output unit 2045. As illustrated in FIG. 2, respective signals of the shift position and travel mode from the S/M sensor 27, the vehicle speed from the vehicle speed sensor 26, the destination target engine rotational speed Nt from the destination target engine rotational speed calculation unit 203, the target driving force Fd from the target driving force calculation unit 201, and the engine power generation request from the target generated power calculation unit 202 are input to the final target engine rotational speed calculation unit 204, which executes the processes to be described below, then outputs the generator rotational speed command value to the generator controller 22, and outputs the final target engine rotational speed to the target engine torque calculation unit 205. The processes executed by the driver operation determination calculation unit 2041, the calculation unit 2042 for the target achievement rate to the destination target engine rotational speed, the calculation unit 2043 for the target engine rotational speed change rate during the driver operation, the basic target engine rotational speed calculation unit 2044, and the final target engine rotational speed output unit 2045, which constitute the final target engine rotational speed calculation unit 204, will be described below in this order.

As illustrated in FIG. 5, the target driving force Fd calculated by the target driving force calculation unit 201 and target driving force Fdo before a predetermined number of calculations, which is preliminarily held, are input to the driver operation determination calculation unit 2041, which calculates the amount or factor of change in the target driving force. Here, the target driving force Fdo before a predetermined number of calculations is the target driving force calculated in the routine one time before or a predetermined number of times before. What is calculated herein may be the amount of change obtained by subtracting the driving force Fdo before the predetermined number of calculations from the current target driving force Fd or may also be the factor of change obtained by dividing the current target driving force Fd by the target driving force Fdo before the predetermined number of calculations. In the following description, the embodiment will be described on the assumption that the amount of change ($\Delta Fd=Fd-Fdo$) is calculated by subtracting the driving force Fdo before the predetermined number of calculations from the current target driving force Fd. Examples of the amount of change include a positive amount of change and a negative amount of change. A positive amount of change means that the target driving force increases, while a negative amount of change means that the target driving force decreases. That is, when the driver operates the accelerator, increasing the depression amount of the accelerator pedal (acceleration request) results in a positive amount of change, and decreasing the depression amount of the accelerator pedal (deceleration request) results in a negative amount of change.

Figure 6:
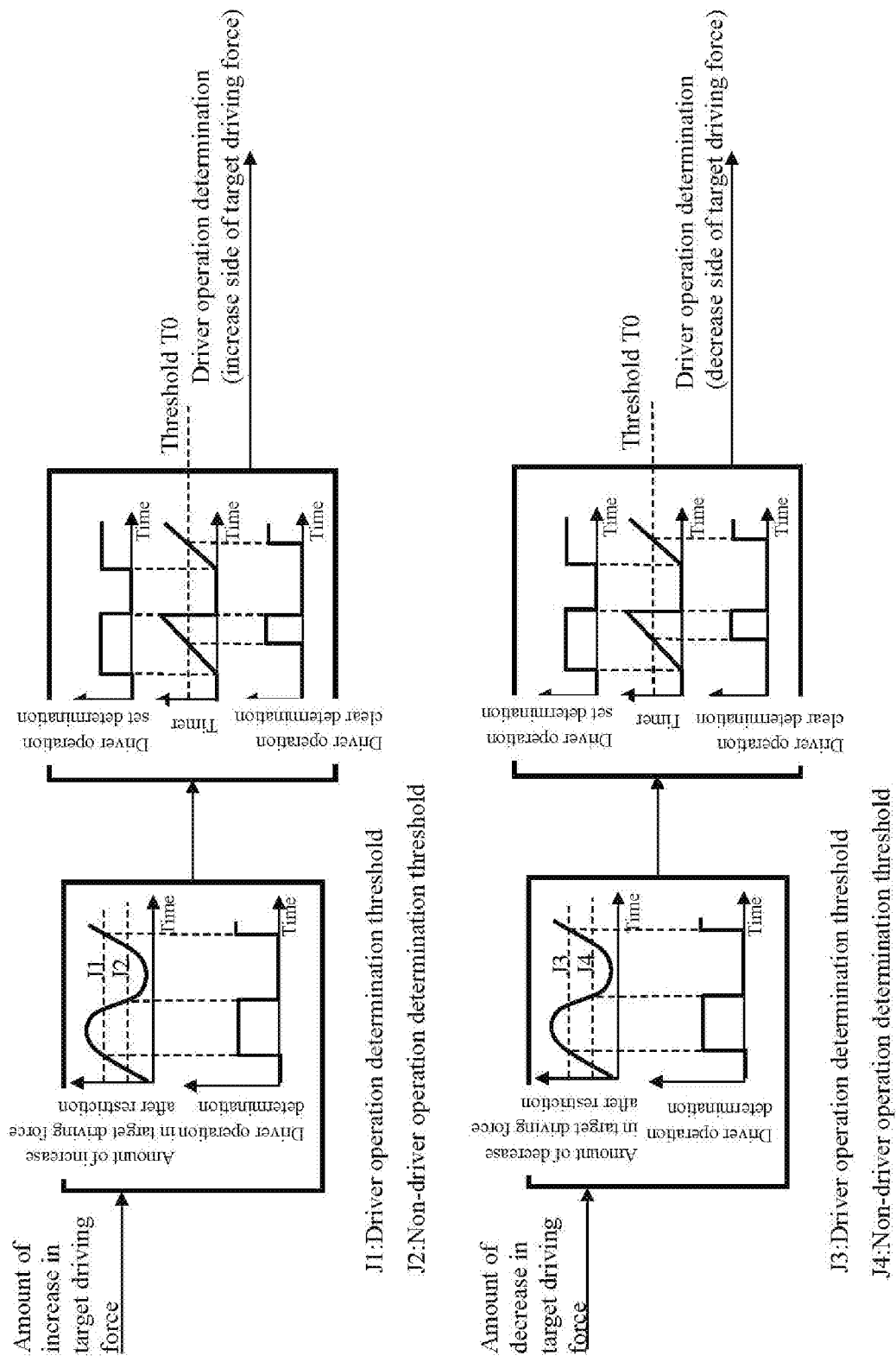
FIG. 6 is a control block diagram illustrating the main configuration of a driver operation determination calculation unit of FIG. 5.

FIG. 6 is a control block diagram illustrating a main configuration of the driver operation determination calculation unit 2041. When the amount of change $\Delta Fd$ obtained by the driver operation determination calculation unit 2041 is a positive amount of change, that is, an amount of increase (acceleration request), as illustrated in the upper left diagram of FIG. 6, a determination is made that the driver requests an increase in the driving force during a period in which the amount of change $\Delta Fd$ is not less than a predetermined first threshold J1 (driver operation determination threshold) while a determination is made that the driver does not request an increase in the driving force during a period in which the amount of change $\Delta Fd$ is not more than a predetermined second threshold J2 (non-driver operation determination threshold). The reason that the first threshold J1 is set to a value larger than the second threshold J2 is to prevent hunting of the determination result. Then, as illustrated in the upper right diagram of FIG. 6, a timer is used to measure the time from the time point at which the amount of increase in the target driving force becomes the first threshold J1 or more, and the flag signal of the driver's request for increasing the driving force is cleared at the time point at which a predetermined time $T_0$ (illustrated as a threshold $T_0$ in FIG. 6) has elapsed. The predetermined time $T_0$ is not particularly limited, but is, for example, several seconds. Until the predetermined time $T_0$ elapses, the rotational speed of the engine 11 is controlled based on the change rate of the rotational speed of the engine 11 subjected to a first-order lag process or the like, which will be described later, and after the predetermined time $T_0$ has elapsed, the rotational speed of the engine 11 is controlled based on the target driving force Fd. The predetermined time $T_0$ is a time during which the driver requests an increase in the driving force. In other words, the predetermined time $T_0$ is a time during which the driver determines that the change in the rotational speed of the engine is due to the accelerator operation intended for acceleration. If the change in the rotational speed of the engine is delayed with respect to the predetermined time $T_0$, the driver may possibly determine that the change is not due to the accelerator operation.

Likewise, when the amount of change ΔFd obtained by the driver operation determination calculation unit 2041 is a negative amount of change, that is, an amount of decrease (deceleration request), as illustrated in the lower left diagram of FIG. 6, a determination is made that the driver requests a decrease in the driving force during a period in which the amount of change ΔFd is not less than a predetermined third threshold J3 (driver operation determination threshold) while a determination is made that the driver does not request a decrease in the driving force during a period in which the amount of change ΔFd is not more than a predetermined fourth threshold J4 (non-driver operation determination threshold). The reason that the third threshold J3 is set to a value larger than the fourth threshold J4 is to prevent hunting of the determination result. Then, as illustrated in the lower right diagram of FIG. 6, a timer is used to measure the time from the time point at which the amount of decrease in the target driving force becomes third threshold J3 or more, and the flag signal of the driver's request for decreasing the driving force is cleared at the time point at which a predetermined time $T_0$ (illustrated as a threshold $T_0$ in FIG. 6) has elapsed. The predetermined time $T_0$ is not particularly limited, but is, for example, several seconds. Until the predetermined time $T_0$ elapses, the rotational speed of the engine 11 is controlled based on the change rate of the rotational speed of the engine 11 subjected to a first-order lag process or the like, which will be described later, and after the predetermined time $T_0$ has elapsed, the rotational speed of the engine 11 is controlled based on the target driving force Fd. The predetermined time $T_0$ is a time during which the driver requests a decrease in the driving force. In other words, the predetermined time $T_0$ is a time during which the driver determines that the change in the rotational speed of the engine is due to the accelerator operation intended for deceleration. If the change in the rotational speed of the engine is delayed with respect to the predetermined time $T_0$, the driver may possibly determine that the change is not due to the accelerator operation.

The driver operation determination calculation unit 2041 uses the flag signal to output the determination result as to whether the amount of change in the target driving force is on the increase side or on the decrease side to the calculation unit 2042 for the target achievement rate to the destination target engine rotational speed.

As illustrated in FIG. 5, the target driving force Fd calculated by the target driving force calculation unit 201, the flag signal of the driver determination (the increase side or decrease side of the target driving force) calculated by the driver operation determination calculation unit 2041, and the signals of the shift position and travel mode from the S/M sensor 27 are input to the calculation unit 2042 for the target achievement rate to the destination target engine rotational speed (also simply referred to as a target achievement rate calculation unit 2042, hereinafter), which executes the processes to be described below and then outputs the target achievement rate to the destination target engine rotational speed (the increase side or decrease side of the target driving force) to the calculation unit 2043 for the target engine rotational speed change rate during the driver operation.

Figure 7:
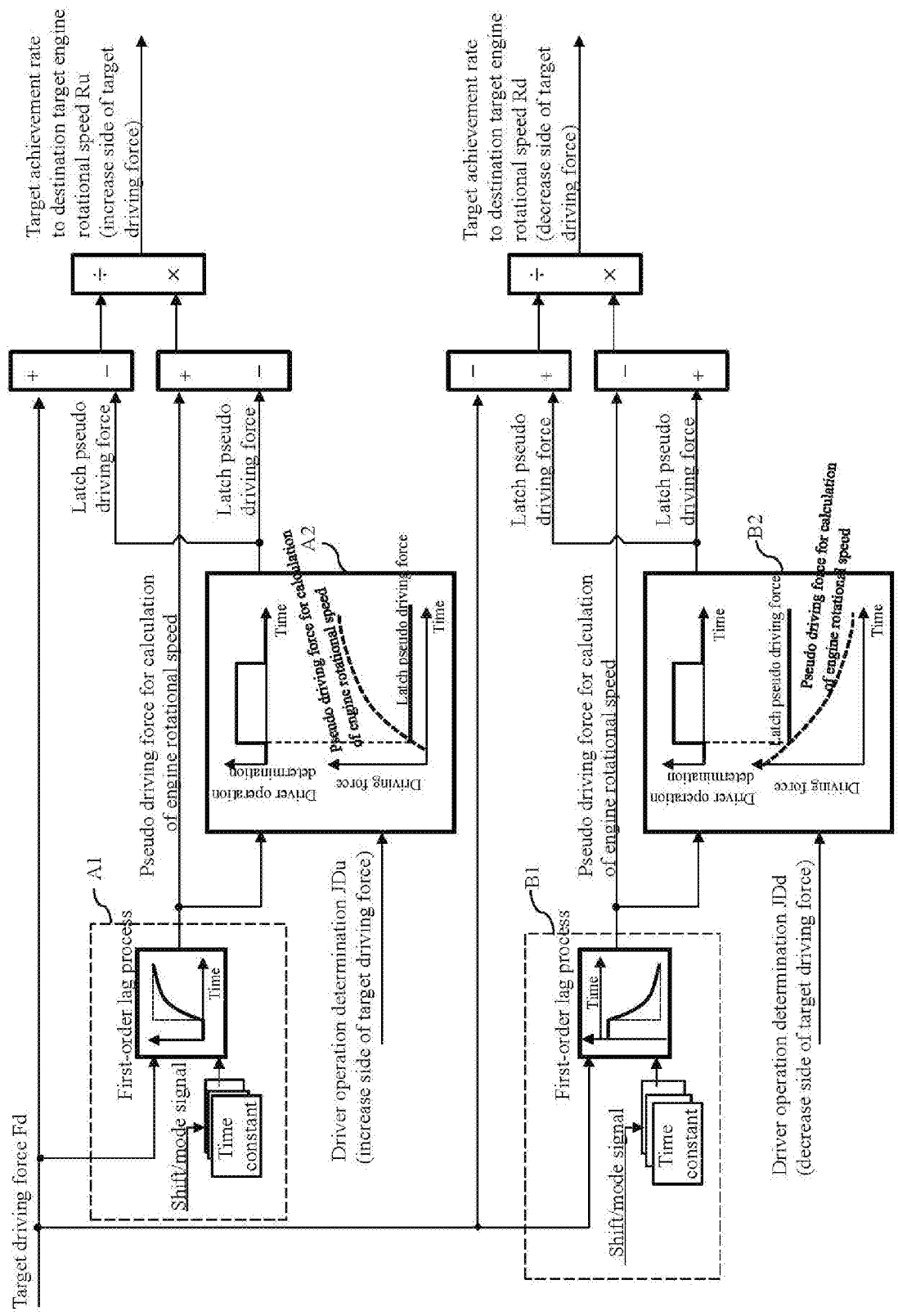
FIG. 7 is a control block diagram illustrating the main configuration of a calculation unit of FIG. 5 for a target achievement rate to a destination target engine rotational speed.

FIG. 7 is a control block diagram illustrating a main configuration of the target achievement rate calculation unit 2042. The upper control blocks of FIG. 7 represent processes executed when the target driving force increases (acceleration request), and the lower control blocks of FIG. 7 represent processes executed when the target driving force decreases (deceleration request). First, the processes executed when the target driving force increases will be described with reference to the upper control blocks of FIG. 7. As illustrated by a dashed-line frame A1 in the upper part of FIG. 7, the target driving force Fd calculated by the target driving force calculation unit 201 is subjected to a first-order lag process using a time constant as a parameter. The graph in the dashed-line frame A1 illustrates the driving force (vertical axis) with respect to time (horizontal axis). In this graph, the dotted line represents the target driving force while the solid line represents the driving force subjected to the first-order lag process (referred to as pseudo driving force for calculation of the engine rotational speed or referred simply to as pseudo driving force, hereinafter).

The time constant of the present embodiment is set to a small value in the case of the sports travel mode, set to a large value in the case of the eco-travel mode, or set to a medium value in the case of the normal travel mode in accordance with the signals of the shift position and travel mode from the S/M sensor 27. That is, the time constant is set such that the rising slope of the pseudo driving force is large in the sports travel mode while the rising slope of the pseudo driving force is small in the eco-travel mode. Even in the same travel mode, when the shift position is the brake position, the time constant is set smaller than that when the shift position is the drive position, that is, the rising slope of the pseudo driving force is set relatively large. In the present embodiment, the first-order lag process is exemplified as a typical process for the amount or factor of change in the target driving force Fd, but the present invention is not limited to using the first-order lag process, and it suffices that a profile is obtained in which the driving force gradually approaches the target driving force until after a predetermined time with a time delay with respect to a time function of the target driving force, that is, it suffices that a profile is obtained in which the change rate of the pseudo driving force gradually decreases with time. The profile is preferably designed such that the change rate of the pseudo driving force increases as the amount or factor of change in the target driving force increases.

The target achievement rate calculation unit 2042 holds the driving force subjected to the first-order lag process as the pseudo driving force. In addition, the target achievement rate calculation unit 2042 refers to the flag signal of the driver determination (the increase side of the target driving force) from the driver operation determination calculation unit 2041 and, as illustrated by a solid-line frame A2 in the upper part of FIG. 7, holds the pseudo driving force at the time point at which the driver operation determination is made, as latch pseudo driving force. Then, the target achievement rate calculation unit 2042 calculates a value (0 to 1) or its percentage (0% to 100%) by dividing the difference between the pseudo driving force and the latch pseudo driving force by the difference between the target driving force Fd and the latch pseudo driving force. This calculated value is used as the target achievement rate to the destination target engine rotational speed (the increase side of the target driving force). Although details will be described later, the purpose of calculating the target achievement rate of the pseudo driving force to the target driving force is to use this as a reference when calculating the change rate of the engine rotational speed, which is desired to be ultimately obtained in the present embodiment, and to obtain an engine rotational speed that does not give an uncomfortable feeling.

The processes executed when the target driving force decreases as illustrated in the lower control blocks of FIG. 7 can be obtained as those symmetrical to the above-described processes executed when the target driving force increases. The processes executed when the target driving force decreases will be described with reference to the lower control blocks of FIG. 7. As illustrated by a dashed-line frame B1 in the lower part of FIG. 7, the target driving force Fd calculated by the target driving force calculation unit 201 is subjected to a first-order lag process using a time constant as a parameter. The graph in the dashed-line frame B1 illustrates the driving force (vertical axis) with respect to time (horizontal axis). In this graph, the dotted line represents the target driving force while the solid line represents the driving force subjected to the first-order lag process (referred to as pseudo driving force for calculation of the engine rotational speed or referred simply to as pseudo driving force, hereinafter).

The time constant of the present embodiment is set to a small value in the case of the sports travel mode, set to a large value in the case of the eco-travel mode, or set to a medium value in the case of the normal travel mode in accordance with the signals of the shift position and travel mode from the S/M sensor 27. That is, the time constant is set such that the falling slope of the pseudo driving force is large in the sports travel mode while the falling slope of the pseudo driving force is small in the eco-travel mode. Even in the same travel mode, when the shift position is the brake position, the time constant is set smaller than that when the shift position is the drive position, that is, the falling slope of the pseudo driving force is set relatively large. In the present embodiment, the first-order lag process is exemplified as a typical process for the amount or factor of change in the target driving force Fd, but the present invention is not limited to using the first-order lag process, and it suffices that a profile is obtained in which the driving force gradually approaches the target driving force until after a predetermined time with a time delay with respect to a time function of the target driving force, that is, it suffices that a profile is obtained in which the change rate of the pseudo driving force gradually decreases with time. The profile is preferably designed such that the change rate of the pseudo driving force increases as the amount or factor of change in the target driving force increases.

The target achievement rate calculation unit 2042 holds the driving force subjected to the first-order lag process as the pseudo driving force. In addition, the target achievement rate calculation unit 2042 refers to the flag signal of the driver determination (the decrease side of the target driving force) from the driver operation determination calculation unit 2041 and, as illustrated by a solid-line frame B2 in the lower part of FIG. 7, holds the pseudo driving force at the time point at which the driver operation determination is made, as latch pseudo driving force. Then, the target achievement rate calculation unit 2042 calculates a value (0 to 1) or its percentage (0% to 100%) by dividing the difference between the pseudo driving force and the latch pseudo driving force by the difference between the target driving force Fd and the latch pseudo driving force. This calculated value is used as the target achievement rate to the destination target engine rotational speed (the decrease side of the target driving force). Although details will be described later, the purpose of calculating the target achievement rate of the pseudo driving force to the target driving force is to use this as a reference when calculating the change rate of the engine rotational speed, which is desired to be ultimately obtained in the present embodiment, and to obtain an engine rotational speed that does not give an uncomfortable feeling.

The target achievement rate to the destination target engine rotational speed (the increase side or decrease side of the target driving force) calculated by the target achievement rate calculation unit 2042 is output, as illustrated in FIG. 5, to the calculation unit 2043 for the target engine rotational speed change rate during the driver operation.

As illustrated in FIG. 5, the destination target engine rotational speed (when power generation is requested) from the destination target engine rotational speed calculation unit 203, the target achievement rate to the target engine rotational speed (the increase side or decrease side of the target driving force) from the target achievement rate calculation unit 2042, the flag signal of the driver operation determination (the increase side or decrease side of the target driving force) from the driver operation determination calculation unit 2041, and the final target engine rotational speed before the predetermined number of calculations which is output from the final target engine rotational speed output unit 2045 are input to the calculation unit 2043 for the target engine rotational speed change rate during the driver operation, which executes the processes to be described below and then outputs the target engine rotational speed increase rate during the driver operation or the target engine rotational speed decrease rate during the driver operation to the basic target engine rotational speed calculation unit 2044. The final target engine rotational speed before the predetermined number of calculations is the final target engine rotational speed which is output in the routine one time before or a predetermined number of times before.

Figure 8:
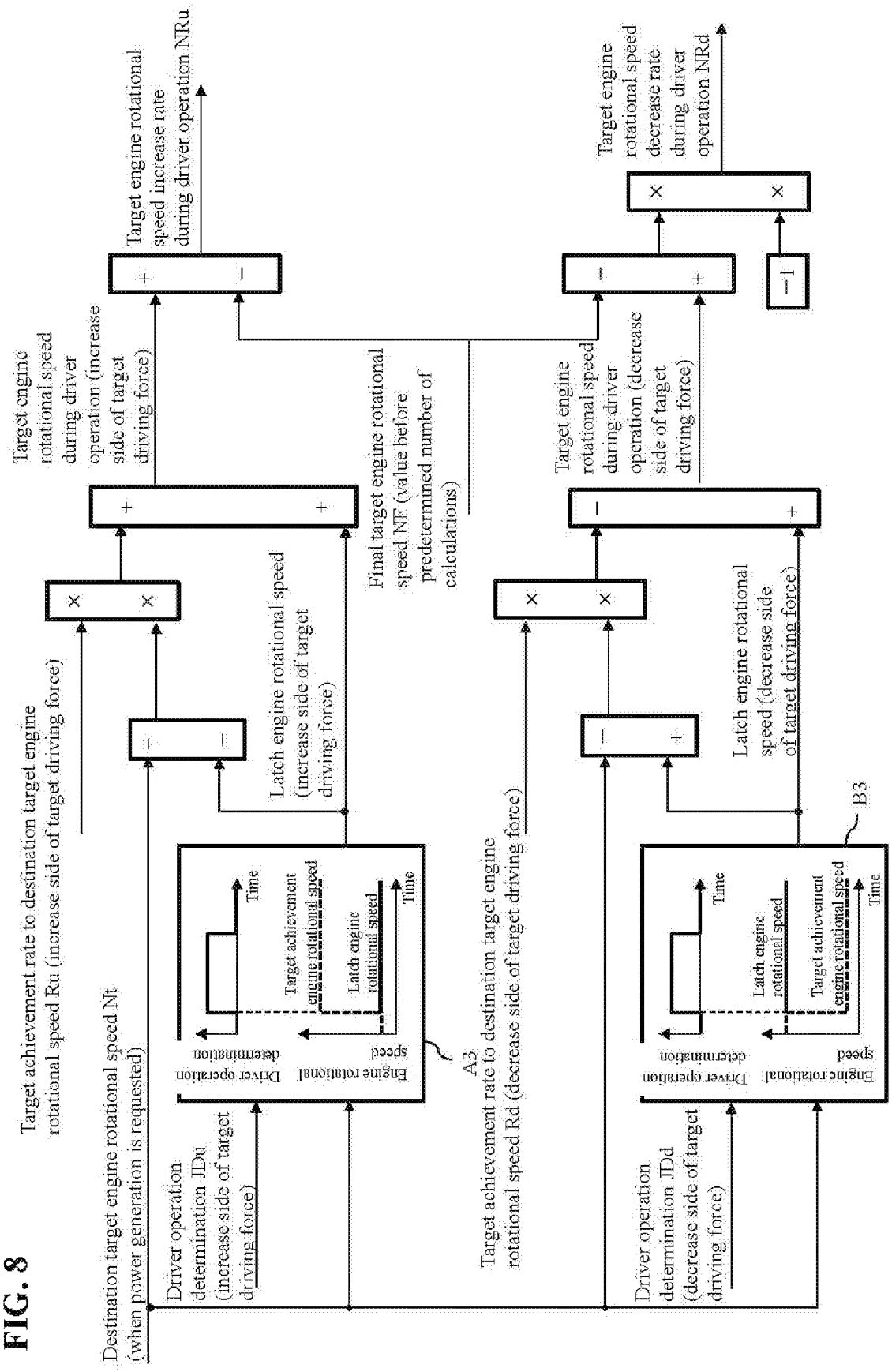
FIG. 8 is a control block diagram illustrating the main configuration of a calculation unit of FIG. 5 for a target engine rotational speed change rate during the driver operation.

FIG. 8 is a control block diagram illustrating a main configuration of the calculation unit 2043 for the target engine rotational speed change rate during the driver operation. The upper control blocks of FIG. 8 represent processes executed when the target driving force increases (acceleration request), and the lower control blocks of FIG. 8 represent processes executed when the target driving force decreases (deceleration request). First, the processes executed when the target driving force increases will be described with reference to the upper control blocks of FIG. 8. As illustrated by a solid-line frame A3 in the upper part of FIG. 8, the destination target engine rotational speed Nt (when power generation is requested) from the destination target engine rotational speed calculation unit 203 and the flag signal of the driver operation determination (the increase side of the target driving force) from the driver operation determination calculation unit 2041 are used to hold the target engine rotational speed at the time point at which the driver operation determination is made, as a latch engine rotational speed, and the value obtained by subtracting the latch engine rotational speed from the destination target engine rotational speed Nt (the amount of change in the engine rotational speed) is multiplied by the target achievement rate to the target engine rotational speed from the target achievement rate calculation unit 2042. This is because the achievement rate of the pseudo driving force to the target driving force (corresponding to the profile of the pseudo driving force) should be made to match the change rate of the engine rotational speed.

Then, the target engine rotational speed during the driver operation is obtained through adding the latch engine rotational speed to the value obtained by multiplying the target achievement rate to the target engine rotational speed by the value (the amount of change in the engine rotational speed), which is obtained by subtracting the latch engine rotational speed from the destination target engine rotational speed Nt, and the value (amount of increase) obtained by subtracting a final target engine rotational speed NF before the predetermined number of calculations from the target engine rotational speed during the driver operation is determined as a target engine rotational speed increase rate during the driver operation NRu per one calculation (one routine). The target engine rotational speed increase rate during the driver operation NRu is output, as illustrated in FIG. 5, to the basic target engine rotational speed calculation unit 2044.

The processes executed when the target driving force decreases as illustrated in the lower control blocks of FIG. 8 can be obtained as those symmetrical to the above-described processes executed when the target driving force increases. That is, as illustrated by a solid-line frame B3 in the lower part of FIG. 8, the destination target engine rotational speed Nt (when power generation is requested) from the destination target engine rotational speed calculation unit 203 and the flag signal of the driver operation determination (the decrease side of the target driving force) from the driver operation determination calculation unit 2041 are used to hold the target engine rotational speed at the time point at which the driver operation determination is made, as a latch engine rotational speed, and the value obtained by adding the latch engine rotational speed to the destination target engine rotational speed Nt (the amount of change in the engine rotational speed) is multiplied by the target achievement rate to the target engine rotational speed from the target achievement rate calculation unit 2042. This is because the achievement rate of the pseudo driving force to the target driving force (corresponding to the profile of the pseudo driving force) should be made to match the change rate of the engine rotational speed.

Then, the target engine rotational speed during the driver operation is obtained through subtracting, from the latch engine rotational speed, the value obtained by multiplying the target achievement rate to the target engine rotational speed by the value (the amount of change in the engine rotational speed), which is obtained by subtracting the destination target engine rotational speed Nt from the latch engine rotational speed, and the value (amount of decrease) obtained by subtracting a final target engine rotational speed NF before the predetermined number of calculations from the target engine rotational speed during the driver operation is reversed in its sign (absolute value of the amount of decrease) and determined as a target engine rotational speed decrease rate during the driver operation NRd per one calculation (one routine). The target engine rotational speed decrease rate during the driver operation NRd is output, as illustrated in FIG. 5, to the basic target engine rotational speed calculation unit 2044.

As illustrated in FIG. 5, the engine power generation request signal from the target generated power calculation unit 202, the target engine rotational speed increase rate during the driver operation or target engine rotational speed decrease rate during the driver operation from the calculation unit 2043 for the target engine rotational speed change rate during the driver operation, the vehicle speed from the vehicle speed sensor 26, the flag signal of the driver operation determination (the increase side or decrease side of the target driving force) from the driver operation determination calculation unit 2041, and the final target engine rotational speed before the predetermined number of calculations from the final target engine rotational speed output unit 2045 are input to the basic target engine rotational speed calculation unit 2044, which executes the processes to be described below and then outputs the basic target engine rotational speed (the increase side or decrease side) to the final target engine rotational speed output unit 2045.

Figure 9:
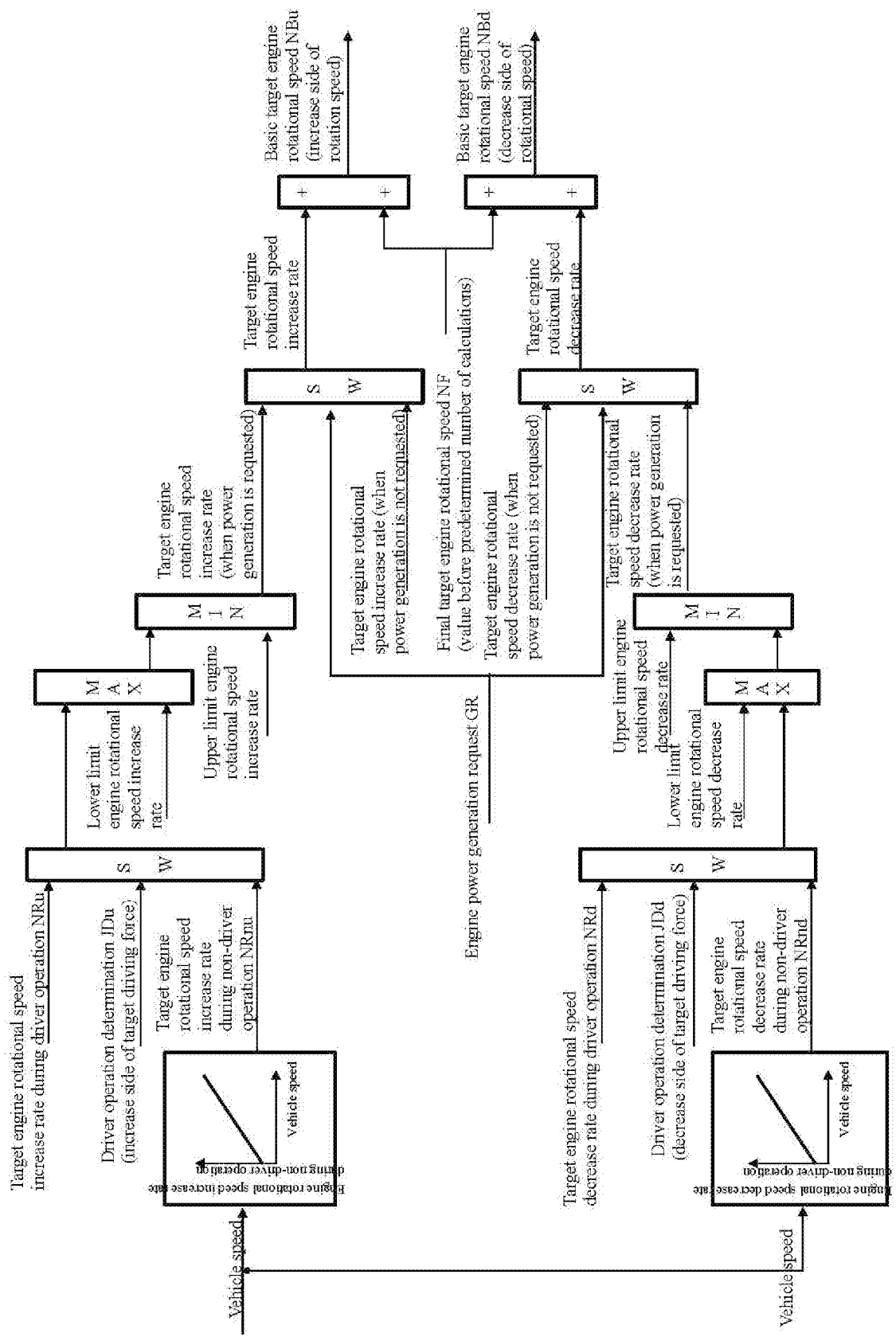
FIG. 9 is a control block diagram illustrating the main configuration of a basic target engine rotational speed calculation unit of FIG. 5.

FIG. 9 is a control block diagram illustrating a main configuration of the basic target engine rotational speed calculation unit 2044. The upper control blocks of FIG. 9 represent processes executed when the target driving force increases (acceleration request), and the lower control blocks of FIG. 9 represent processes executed when the target driving force decreases (deceleration request). First, the processes executed when the target driving force increases will be described with reference to the upper control blocks of FIG. 9. The vehicle speed from the vehicle speed sensor 26 is input, and an engine rotational speed increase rate NRnu when the driver operation determination calculation unit 2041 of FIG. 5 determines that the driver operation is not performed (this determination will also be referred to as a non-driver operation determination) is extracted from the illustrated control map. Then, when the driver operation determination is not made, a selection switch is used to select the target engine rotational speed increase rate during the non-driver operation determination NRnu extracted from the illustrated control map. In the case in which the driver depresses and releases the accelerator pedal so that the accelerator pedal is sequentially operated and in other similar cases, the driving at an optimum fuel consumption rotational speed may be difficult because the destination target engine rotational speed Nt (when power generation is requested) varies sequentially. Accordingly, after the lapse of a predetermined time (threshold $T_0$), that is, at the time of the non-driver operation determination, a predetermined constant engine rotational speed increase rate during the non-driver operation (a constant increase rate is set with respect to the vehicle speed) as in the illustrated control map is used thereby to allow the final target engine rotational speed NF to reach the destination target engine rotational speed Nt (when power generation is requested) in as short a time as possible. In contrast, when the driver operation determination is made, the selection switch is used to select the target engine rotational speed increase rate during the driver operation NRu from the calculation unit 2043 for the target engine rotational speed change rate during the driver operation.

Then, the target engine rotational speed increase rate during the driver operation or target engine rotational speed increase rate during the non-driver operation selected by the selection switch is compared with each of the lower limit engine rotational speed increase rate and the upper limit engine rotational speed increase rate (the illustrated select-high comparator and select-low comparator), and an a restriction process is performed such that the target engine rotational speed increase rate during the driver operation or target engine rotational speed increase rate during the non-driver operation selected by the selection switch does not fall below the lower limit engine rotational speed increase rate and does not exceed the upper limit engine rotational speed increase rate. Here, the reason for restricting the lower limit using the lower limit engine rotational speed increase rate is to allow the engine sound rise feeling to respond better to the acceleration feel of the vehicle. The target engine rotational speed increase rate thus calculated (when power generation is requested) is input to a selection switch together with a predetermined target engine rotational speed increase rate (when power generation is not requested). When the engine power generation request is issued from the target generated power calculation unit 202 illustrated in FIG. 2, the target engine rotational speed increase rate (when power generation is requested) is selected, while when the engine power generation request is not issued, the target engine rotational speed increase rate (when power generation is not requested) is selected. Then, the target engine rotational speed increase rate (when power generation is requested or is not requested) selected by the selection switch is added to the final target engine rotational speed NF before the predetermined number of calculations to obtain a basic target engine rotational speed NBu. The basic target engine rotational speed NBu is output to the final target engine rotational speed output unit 2045.

The processes executed when the target driving force decreases as illustrated in the lower control blocks of FIG. 9 can be obtained as those symmetrical to the above-described processes executed when the target driving force increases. That is, the vehicle speed from the vehicle speed sensor 26 is input, and an engine rotational speed decrease rate NRnd when the driver operation determination calculation unit 2041 of FIG. 5 determines that the driver operation is not performed (this determination will also be referred to as a non-driver operation determination) is extracted from the illustrated control map. Then, when the driver operation determination is not made, a selection switch is used to select the target engine rotational speed decrease rate during the non-driver operation determination NRnd extracted from the illustrated control map. In the case in which the driver depresses and releases the accelerator pedal so that the accelerator pedal is sequentially operated and in other similar cases, the driving at an optimum fuel consumption rotational speed may be difficult because the destination target engine rotational speed Nt (when power generation is requested) varies sequentially. Accordingly, after the lapse of a predetermined time (threshold $T_0$), that is, at the time of the non-driver operation determination, a predetermined constant engine rotational speed decrease rate during the non-driver operation (a constant decrease rate is set with respect to the vehicle speed) as in the illustrated control map is used thereby to allow the final target engine rotational speed NF to reach the destination target engine rotational speed Nt (when power generation is requested) in as short a time as possible. In contrast, when the driver operation determination is made, the selection switch is used to select the target engine rotational speed decrease rate during the driver operation NRd from the calculation unit 2043 for the target engine rotational speed change rate during the driver operation.

Then, the target engine rotational speed decrease rate during the driver operation or target engine rotational speed decrease rate during the non-driver operation selected by the selection switch is compared with each of the lower limit engine rotational speed decrease rate and the upper limit engine rotational speed decrease rate (the illustrated select-high comparator and select-low comparator), and an a restriction process is performed such that the target engine rotational speed decrease rate during the driver operation or target engine rotational speed decrease rate during the non-driver operation selected by the selection switch does not fall below the lower limit engine rotational speed decrease rate and does not exceed the upper limit engine rotational speed decrease rate. Here, the reason for restricting the lower limit using the lower limit engine rotational speed decrease rate is to allow the engine sound rise feeling to respond better to the deceleration feel of the vehicle. The target engine rotational speed decrease rate thus calculated (when power generation is requested) is input to a selection switch together with a predetermined target engine rotational speed decrease rate (when power generation is not requested). When the engine power generation request is issued from the target generated power calculation unit 202 illustrated in FIG. 2, the target engine rotational speed decrease rate (when power generation is requested) is selected, while when the engine power generation request is not issued, the target engine rotational speed decrease rate (when power generation is not requested) is selected. Then, the target engine rotational speed decrease rate (when power generation is requested or is not requested) selected by the selection switch is added to the final target engine rotational speed NF before the predetermined number of calculations to obtain a basic target engine rotational speed NBd. The basic target engine rotational speed NBd is output to the final target engine rotational speed output unit 2045.

Referring again to FIG. 5, the destination target engine rotational speed Nt (when power generation is requested) from the destination target engine rotational speed calculation unit 203 of FIG. 2 and the basic target engine rotational speed (increase side NBu or decrease side NBd) from the basic target engine rotational speed calculation unit 2044 are input to the final target engine rotational speed output unit 2045. When the engine power generation request is issued from the target generated power calculation unit 202 of FIG. 2, the final target engine rotational speed output unit 2045 selects a smaller one from the destination target engine rotational speed Nt (when power generation is requested) and the basic engine rotational speed (increase side NBu) and a larger one from the selected engine rotational speed and the basic engine rotational speed (decrease side NBd). In the case in which the driver depresses and releases the accelerator pedal so that the accelerator pedal is sequentially operated and in other similar cases, the driving at an optimum fuel consumption rotational speed may be difficult because the destination target engine rotational speed Nt (when power generation is requested) varies sequentially. Accordingly, after the lapse of a predetermined time (threshold $T_0$) (i.e., at the time of the non-driver operation determination), as described with reference to FIG. 9, a predetermined constant engine rotational speed increase rate during the non-driver operation is used thereby to allow the final target engine rotational speed NF to reach the destination target engine rotational speed Nt (when power generation is requested). Thereafter, the destination target engine rotational speed Nt (when power generation is requested) is used to control the engine rotational speed. The destination target engine rotational speed Nt (when power generation is requested) is determined based on the target driving force Fd, as described for the destination target engine rotational speed calculation unit 203 of FIG. 2. The engine rotational speed thus selected is output as the final target engine rotational speed NF to the target engine torque calculation unit 205 illustrated in FIG. 2. In addition, the engine rotational speed thus selected is divided by the speed increase ratio of the speed-up gear 112 to obtain the generator rotational speed command value to the generator 12, and this command is output to the generator controller 22.

When the engine power generation request is not issued from the target generated power calculation unit 202 of FIG. 2, the final target engine rotational speed output unit 2045 selects a smaller one from a separately determined destination target engine rotational speed (when power generation is not requested) and the basic engine rotational speed (increase side NBu) and a larger one from the selected engine rotational speed and the basic engine rotational speed (decrease side NBd). The engine rotational speed thus selected is output as the final target engine rotational speed NF to the target engine torque calculation unit 205 illustrated in FIG. 2. In addition, the engine rotational speed thus selected is divided by the speed increase ratio of the speed-up gear 112 to obtain the generator rotational speed command value to the generator 12, and this command is output to the generator controller 22.

Referring again to FIG. 2, the final target engine rotational speed NF from the final target engine rotational speed calculation unit 204 and the target generated power Pe from the target generated power calculation unit 202 are input to the target engine torque calculation unit 205, which divides the target generated power Pe by the final target engine rotational speed NF to obtain the basic target engine torque, restricts the upper limit and lower limit using predetermined lower limit engine torque and upper limit engine torque, and then calculates an engine torque command value Te. The engine torque command value Te is output to the engine controller 21, and the engine 11 is driven in accordance with the command value.

Figure 10:
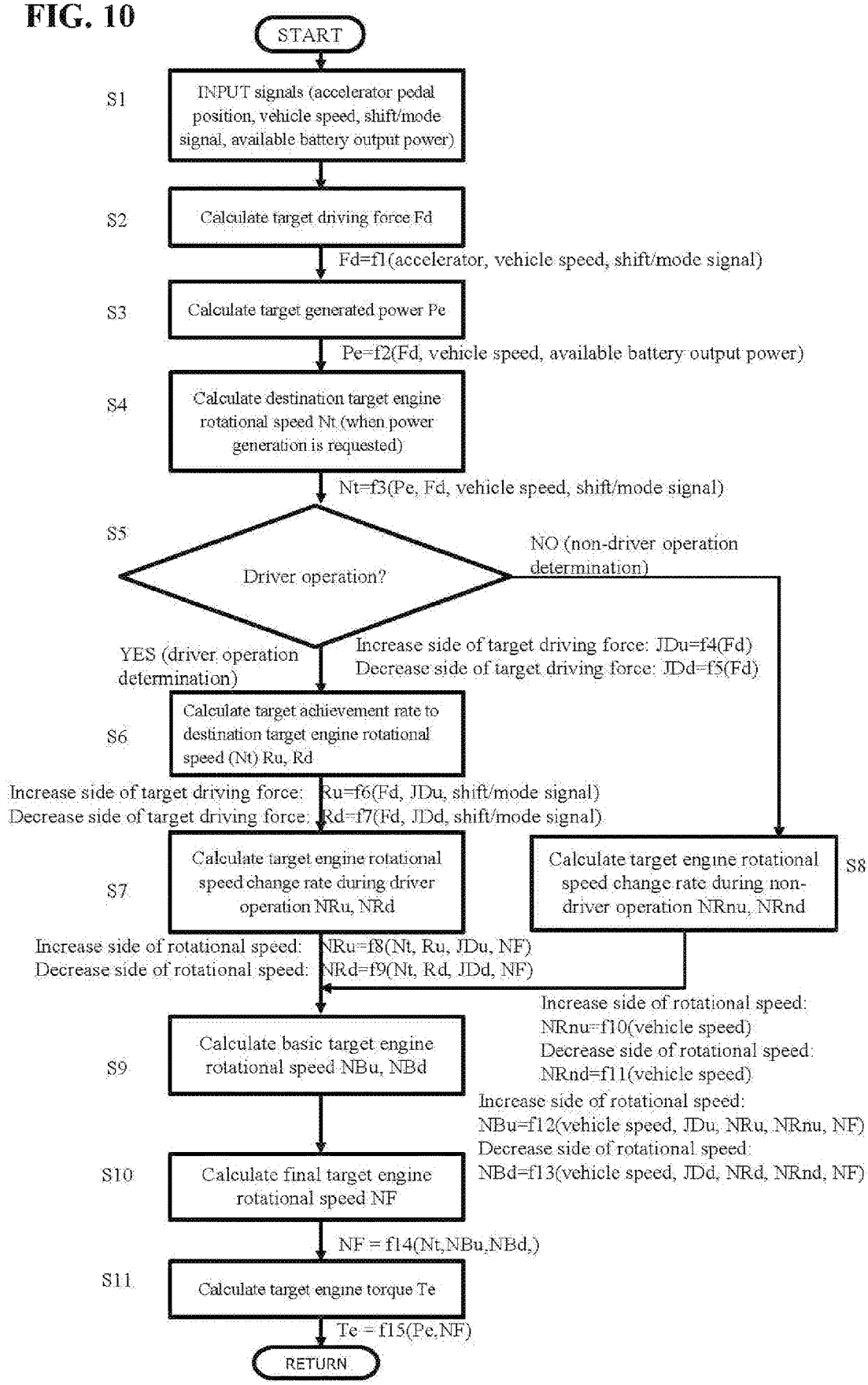
FIG. 10 is a flowchart illustrating the main processing content executed by a vehicle controller of FIGS. 1 and 2.
Figure 11:
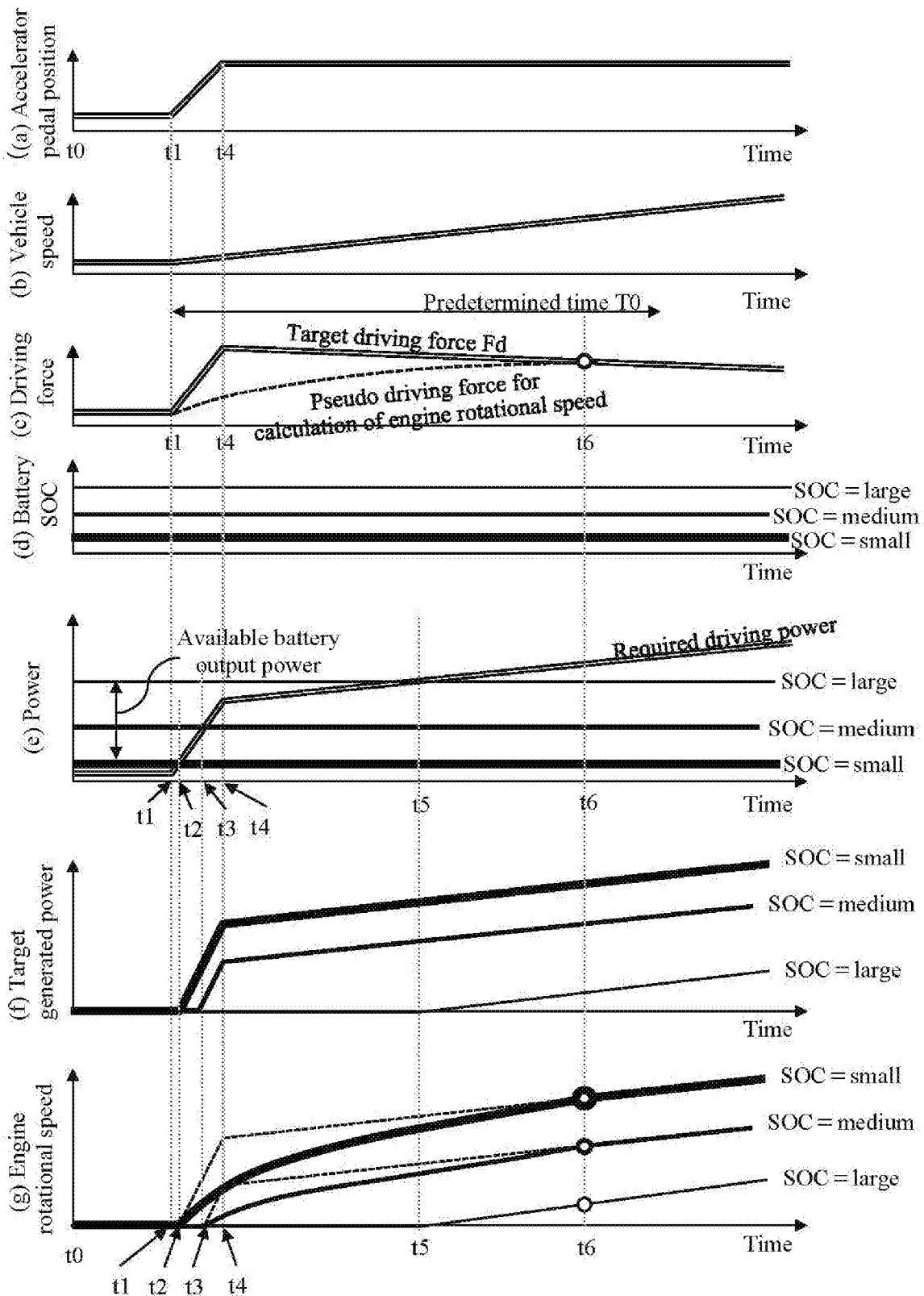
FIG. 11 is a set of time charts illustrating behaviors of respective parameters in a typical scene (during acceleration) for the hybrid vehicle illustrated in FIG. 1.

An example of the operation of the hybrid vehicle 1 of the above-described embodiment will then be described. FIG. 10 is a flowchart illustrating the processing content executed by the vehicle controller 20, and FIG. 11 is a set of time charts (a) to (g) illustrating behaviors of respective parameters in a typical scene for the hybrid vehicle 1. The processes in the flowchart of FIG. 10 are repeated at time intervals of, for example, 10 msec.

FIG. 11 illustrates a state or scene in which the driver is driving the hybrid vehicle. As illustrated in the accelerator pedal position/time graph of FIG. 11(*a*), the driver depresses the accelerator pedal with a constant amount during time t0 to t1, then further depresses the accelerator pedal during time t1 to t4, and maintains the depression amount after time t4. The present embodiment can be applied not only to a hybrid vehicle in which the driver performs manual driving but also to a hybrid vehicle having a so-called automated (autonomous) driving function in which such an accelerator operation is performed in accordance with an accelerator command value that is calculated using the automated (autonomous) driving function.

As illustrated in the vehicle speed/time graph of FIG. 11(*b*), the driver's accelerator operation allows the vehicle to travel at a constant speed during time t0 to t1 and then accelerate at time t1 to gradually increase the vehicle speed. The battery SOC/time graph of FIG. 11 (*d*) is illustrated with different thicknesses of lines when the state of charge SOC of the battery 14 is large, medium, and small, and the thicknesses of parameter variation lines in each graph of FIGS. 11(*e*) to (*g*) are illustrated so as to correspond to the states of charge SOC (large/medium/small) of the battery 14.

The driving force/time graph of FIG. 11(*c*) illustrates the target driving force Fd calculated by the target driving force calculation unit 201 of FIG. 2 and the pseudo driving force (pseudo driving force for calculating the engine rotational speed) calculated by the target achievement rate calculation unit 2042 of FIGS. 5 and 7. The power/time graph of FIG. 11(*e*) illustrates the target driving power required for the electric motor 13 corresponding to the target driving force Fd and the available output power of the battery 14 (when the state of charge SOC of the battery 14 is large/medium/small). The target generated power/time graph of FIG. 11(*f*) illustrates the target generated power calculated by the target generated power calculation unit 202 of FIG. 2 for each state of charge SOC (large/medium/small) of the battery 14. The engine rotational speed/time graph of FIG. 11(*g*) illustrates the final target engine rotational speed NF calculated by the final target engine rotational speed output unit 2045 of FIG. 5 for each state of charge SOC (large/medium/small) of the battery 14.

In the power/time graph of FIG. 11(*e*), provided that the required driving power varies to follow the power/time graph of FIG. 11(*e*) as the driver performs the accelerator operation as illustrated in the graph of FIG. 11(*a*), when the state of charge SOC of the battery 14 is small, the required driving power exceeds the available battery output power at time t2 and the engine power generation increase request is therefore issued, while when the state of charge SOC of the battery 14 is medium, the engine power generation increase request is similarly issued at time t3. Likewise, when the state of charge SOC of the battery 14 is large, the engine power generation increase request is issued at time t5. This is demonstrated in the target generated power/time graph of FIG. 11(*f*). As the target generated power increases (or decreases although not illustrated), the rotational speed of the engine 11 has to be increased (or decreased) accordingly.

In the hybrid vehicle 1 of the present embodiment, when the rotational speed of the engine 11 is increased or decreased as the target generated power increases or decreases, if an attempt is made to rapidly increase or decrease the rotational speed so as to correspond to the target driving force Fd during time t1 to t4 as indicated by dotted lines in the graph of FIG. 11(*g*), the rotational speed of the engine 11 has to be rapidly increased or decreased because the responsiveness of the engine 11 to the accelerator pedal position is slower than the responsiveness of the electric motor 13. Accordingly, the engine sound may sharply increase even though the driver does not depress the accelerator pedal so much, or the engine sound may sharply decrease even though the driver does not release the accelerator pedal so much, and a sudden uncomfortable feeling may thus be given to the driver. Additionally or alternatively, if an attempt is made to increase or decrease the rotational speed of the engine 11 so as to correspond to the target driving force Fd during time t4 to t6 in the graph of FIG. 11(*g*), the engine sound rise or fall feeling may be low with respect to the acceleration or deceleration feel of the vehicle because the driving force of the electric motor 13 increases or decreases so as to correspond to the target driving force Fd whereas the increase or decrease of the rotational speed of the engine 11 is small. In the hybrid vehicle 1 of the present embodiment, the rotational speed of the engine 11 is controlled to alleviate an uncomfortable feeling such as a sudden uncomfortable feeling or an uncomfortable feeling in the engine sound rise or fall.

In such a scene, therefore, the following control is conducted. In step S1 illustrated in FIG. 10, respective signals of the accelerator pedal position from the accelerator sensor 25, the vehicle speed from the vehicle speed sensor 26, and the shift position and travel mode from the S/M sensor 27 are input to the target driving force calculation unit 201. In step S2, the target driving force calculation unit 201 executes the processes illustrated in FIG. 3 to obtain the target driving force Fd and the driving motor torque command value.

In step S3, the target generated power calculation unit 202 multiplies the target driving force Fd from the target driving force calculation unit 201 by the vehicle speed from the vehicle speed sensor 26 to obtain the target driving power and subtracts the available battery output power, which is obtained from the battery controller 23, from the target driving power to obtain the basic target generated power. The generated power to be added as required (e.g., the required charging power obtained from the state of charge SOC of the battery 14) is added to the basic target generated power to obtain the target generated power Pe.

In step S4, respective signals of the target generated power Pe calculated by the target generated power calculation unit 202, the target driving force Fd calculated by the target driving force calculation unit 201, and the shift position and travel mode from the S/M sensor 27 are input to the destination target engine rotational speed calculation unit 203, which executes the processes illustrated in FIG. 4 to obtain the destination target engine rotational speed Nt (when power generation is requested).

In step S5, a determination is made as to whether or not a driver operation has been performed, on the basis of the driver operation determination result calculated by the driver operation determination calculation unit 2041 illustrated in FIGS. 5 and 6. When a determination is made that a driver operation has been performed, the process proceeds to step S6, while when a determination is made that no driver operation has been performed, the process proceeds to step S8. Whether or not a driver operation has been performed is determined based on whether or not the absolute value of the increase or decrease amount of the target driving force Fd exceeds the threshold J1 or J3. That is, when the depression amount or release amount of the accelerator pedal by the driver is larger than the threshold, a determination is made that a driver operation has been performed, while when the depression amount or release amount is less than the threshold, a determination is made that no driver operation has been performed. In the scene of FIG. 11, generally, a determination is made that a driver operation has been performed during time t1 to t4, and a determination is made that no driver operation has been performed during time t0 to t1 and after time t4.

In step S6, as illustrated in FIG. 5, the target driving force Fd calculated by the target driving force calculation unit 201, the flag signal of the driver determination (the increase side or decrease side of the target driving force) calculated by the driver operation determination calculation unit 2041, and the signals of the shift position and travel mode from the S/M sensor 27 are input to the target achievement rate calculation unit 2042, which executes the processes illustrated in FIG. 7 to calculate the target achievement rate to the destination target engine rotational speed (the increase side Ru or decrease side Rd of the target driving force). According to step S6, after time t1 illustrated in FIG. 11, the profile of the pseudo driving force for calculation of the engine rotational speed subjected to the first-order lag process with respect to the target driving force Fd (illustrated by a dotted line in the graph of FIG. 11(c)) and the achievement rate of the pseudo driving force to the target driving force Fd per unit time after time t1 are obtained.

In step S7, as illustrated in FIG. 5, the destination target engine rotational speed (when power generation is requested) from the destination target engine rotational speed calculation unit 203, the target achievement rate to the target engine rotational speed (the increase side or decrease side of the target driving force) from the target achievement rate calculation unit 2042, the flag signal of the driver operation determination (the increase side or decrease side of the target driving force) from the driver operation determination calculation unit 2041, and the final target engine rotational speed before the predetermined number of calculations which is output from the final target engine rotational speed output unit 2045 are input to the calculation unit 2043 for the target engine rotational speed change rate during the driver operation, which executes the processes illustrated in FIG. 8 to calculate the target engine rotational speed increase rate during the driver operation NRu or the target engine rotational speed decrease rate during the driver operation NRd.

According to the processes of steps S6 and S7, the target engine rotational speed increase rate during the driver operation NRu or the target engine rotational speed decrease rate during the driver operation NRd corresponding to the achievement rate of the pseudo driving force for calculation of the engine rotational speed illustrated in FIG. 11(c) is obtained, and the rotational speed of the engine 11 varies gently even when the amount of change in the target driving force Fd is large.

When a determination is made in step S5 that no driver operation has been performed (e.g., during time t0 to t1 in FIG. 11), the process proceeds to step S8. In step S8, the target engine rotational speed change rate during the non-driver operation (increase rate NRnu or decrease rate NRnd) when no driver operation has not been performed is calculated.

In step S9, the engine power generation request signal from the target generated power calculation unit 202, the target engine rotational speed increase rate during the driver operation or target engine rotational speed decrease rate during the driver operation from the calculation unit 2043 for the target engine rotational speed change rate during the driver operation, the vehicle speed from the vehicle speed sensor 26, the flag signal of the driver operation determination (the increase side or decrease side of the target driving force) from the driver operation determination calculation unit 2041, and the final target engine rotational speed before the predetermined number of calculations from the final target engine rotational speed output unit 2045 are input to the basic target engine rotational speed calculation unit 2044, which executes the processes illustrated in FIG. 9 to calculate the basic target engine rotational speed (increase side NBu or decrease side NBd).

In step S10, the destination target engine rotational speed Nt (when power generation is requested) from the destination target engine rotational speed calculation unit 203 and the basic target engine rotational speed (increase side NBu or decrease side NBd) from the basic target engine rotational speed calculation unit 2044 are input to the final target engine rotational speed output unit 2045. When the engine power generation request is issued from the target generated power calculation unit 202, the final target engine rotational speed output unit 2045 selects a smaller one from the destination target engine rotational speed Nt (when power generation is requested) and the basic engine rotational speed (increase side NBu) and a larger one from the selected engine rotational speed and the basic engine rotational speed (decrease side NBd), thereby to obtain the final target engine rotational speed NF. In addition, the engine rotational speed thus selected is divided by the speed increase ratio of the speed-up gear 112 to obtain the generator rotational speed command value to the generator 12.

In step S11, the final target engine rotational speed NF from the final target engine rotational speed calculation unit 204 and the target generated power Pe from the target generated power calculation unit 202 are input to the target engine torque calculation unit 205, which divides the final target engine rotational speed NF by the target generated power Pe to obtain the basic target engine torque, restricts the upper limit and lower limit using the predetermined lower limit engine torque and the upper limit engine torque, and then calculates the engine torque command value Te. The engine torque command value Te is output to the engine controller 21, and the engine 11 is driven in accordance with the command value. In the driver operation determination calculation unit 2041 of FIG. 6, a timer is used to measure the time from the time point at which the amount of increase in the target driving force becomes the first threshold J1 or more or the time point at which the amount of decrease in the target driving force becomes the third threshold J3 or more, and the flag signal of the driver's request for increasing or decreasing the driving force is cleared at the time point at which a predetermined time $T_0$ (illustrated as a threshold $T_0$ in FIG. 6) has elapsed. Until the predetermined time $T_0$ elapses, therefore, the rotational speed of the engine 11 is controlled based on the change rate of the rotational speed of the engine 11 subjected to the above-described first-order lag process or the like, but after the predetermined time $T_0$ has elapsed, the driver operation is not to be performed is step S5 of FIG. 10, and the process therefore proceeds to step S8, in which the rotational speed of the engine 11 is controlled based on the target driving force Fd.

As describe above, according to the method and device for controlling the hybrid vehicle 1 of the present embodiment, the change rate of the rotational speed of the engine 11 is set in accordance with the amount or factor of change in the target driving force; therefore, even when the increase amount or increase rate of the target driving force is large, rapid increase in the rotational speed of the engine 11 can be suppressed, while even when the decrease amount or decrease rate of the target driving force is large, rapid decrease in the rotational speed of the engine 11 can be suppressed. As a result, the uncomfortable feeling perceived by the driver, such as a sudden uncomfortable feeling, can be alleviated. In other words, the driver can feel the change in the engine sound and the indication of the engine tachometer in response to the accelerator operation without an uncomfortable feeling.

According to the method and device for controlling a hybrid vehicle of the present embodiment, when the change rate of the rotational speed of the engine is set in accordance with the amount or factor of change in the target driving force, the change rate of the rotational speed of the engine is set higher as the amount or factor of change in the target driving force increases; therefore, the uncomfortable feeling perceived by the driver, such as a sudden uncomfortable feeling, can be alleviated and, at the same time, the driver can feel the change in the engine sound and the indication of the engine tachometer in response to the accelerator operation.

According to the method and device for controlling a hybrid vehicle of the present embodiment, when the change rate of the rotational speed of the engine 11 is set in accordance with the amount or factor of change in the target driving force, the change rate of the rotational speed of the engine 11 is set in accordance with pseudo driving force obtained by subjecting the target driving force to a first-order lag process; therefore, as illustrated in time t1 to t4 of FIG. 11(g), even when the increase amount or increase rate of the target driving force is large, rapid increase in the rotational speed of the engine 11 can be suppressed, while even when the decrease amount or decrease rate of the target driving force is large, rapid decrease in the rotational speed of the engine 11 can be suppressed. As a result, the uncomfortable feeling perceived by the driver, such as a sudden uncomfortable feeling, can be alleviated. Moreover, during time t4 to t6 in the graph of FIG. 11(g), the increase rate (or decrease rate) of the rotational speed of the engine 11 becomes larger than those indicated by the dotted lines in the figure with respect to the acceleration feel (deceleration feel) of the vehicle; therefore, the rise or fall of the engine sound and the change in the indication of the engine tachometer can respond to the acceleration or deceleration feel of the vehicle. In other words, the driver can feel the change in the engine sound and the indication of the engine tachometer in response to the accelerator operation without an uncomfortable feeling. Furthermore, when the increase rate (or decrease rate) of the rotational speed of the engine 11 is made to be a predetermined value or more using the lower limit engine rotational speed increase rate, the rise or fall of the engine sound and the change in the indication of the engine tachometer can respond better to the acceleration or deceleration feel of the vehicle.

According to the method and device for controlling a hybrid vehicle of the present embodiment, the change rate of the rotational speed of the engine 11 is set to a value correlating with an achievement rate of the pseudo driving force to the target driving force; therefore, even when a delay occurs in the rotational speed of the engine, the rotational speed becomes a speed corresponding to the variation in the target driving force. Thus, the driver can feel the change in the engine sound and the indication of the engine tachometer in response to the accelerator operation without an uncomfortable feeling.

According to the method and device for controlling a hybrid vehicle of the present embodiment, when setting is possible for a plurality of travel specifications in which profiles of the target driving force that are set with respect to the traveling speed and the accelerator pedal position are different, the time constant of the first-order lag process is set smaller as the target driving force set with respect to the traveling speed increases in the travel specifications, and the driver can therefore feel the change in the engine sound and the indication of the engine tachometer in response to the accelerator operation and the set travel specifications without an uncomfortable feeling.

According to the method and device for controlling a hybrid vehicle of the present embodiment, the electric motor is controlled based on the target driving force which is not subjected to the first-order lag process, and the actual travel feeling of the vehicle therefore responds to the accelerator operation. Thus, impairment of the acceleration/deceleration feel other than the engine sound is suppressed.

According to the method and device for controlling a hybrid vehicle of the present embodiment, after the predetermined time has elapsed, the rotational speed of the engine 11 is controlled based on a predetermined constant engine rotational speed change rate, and the rotational speed of the engine 11 can therefore be determined so that the acceleration or deceleration of the vehicle is put into a stable state. Thus, the driver can feel the change in the engine sound and the indication of the engine tachometer in response to the accelerator operation without an uncomfortable feeling.

According to the method and device for controlling a hybrid vehicle of the present embodiment, when required power corresponding to the target driving force is insufficient with the power supplied from the battery to the electric motor, power including the insufficient power is supplied from the generator to the electric motor; therefore, the driver can feel the change in the engine sound and the indication of the engine tachometer in response to the accelerator operation without an uncomfortable feeling and, in addition to this, satisfactory vehicle travel can be achieved with respect to the target driving force.

DESCRIPTION OF REFERENCE NUMERALS

1 Hybrid vehicle
11 Engine
111 Output shaft
112 Speed-up gear
12 Generator
121 Rotating shaft
13 Electric motor
131 Rotating shaft
132 Speed-down gear
14 Battery
141 First inverter
142 Second inverter
15 Drive wheel
16 Drive axle
17 Differential gear
171 Gear input shaft
20 Vehicle controller
21 Engine controller
22 Generator controller
23 Battery controller
24 Electric motor controller
25 Accelerator sensor
26 Vehicle speed sensor
27 Shift lever switch sensor/travel mode switch sensor

The invention claimed is:

1. A method for controlling a hybrid vehicle comprising an electric motor that drives the vehicle to travel, a generator that supplies power to the electric motor, and an engine that drives the generator, the method comprising:
   calculating a target driving force for the vehicle, an amount or factor of change in the target driving force, a pseudo driving force, and a latch value of the pseudo driving force,
   wherein the pseudo driving force is obtained by subjecting the target driving force to a first-order lag process,
   wherein the latch value of the pseudo driving force is a value of the pseudo driving force at a specific time point when the amount or factor of change in the target driving force increases, caused by an operation from a driver, to exceed a predetermined value;
   performing a first control before the specific time point, when the amount or factor of change in the target driving force is less than a predetermined threshold, to control a rotational speed of the engine in accordance with the pseudo driving force;
   performing a second control on and after the specific time point, when the amount or factor of change in the target driving force is equal to or more than the predetermined threshold, to control the rotational speed of the engine in accordance with the pseudo driving force and the latch value of the pseudo driving force; and
   when performing the second control, controlling a rotational speed of the engine based on a change rate of the rotational speed of the engine correlated with an achievement rate;
   wherein the achievement rate is calculated based on a ratio of a difference between the pseudo driving force and the latch value of the pseudo driving force versus a difference between the target driving force and the latch value of the pseudo driving force.

2. The method for controlling a hybrid vehicle according to claim 1, wherein an absolute value of the change rate of the rotational speed of the engine is restricted to be a predetermined change rate or more.

3. The method for controlling a hybrid vehicle according to claim 1, wherein
   the vehicle is capable of setting a plurality of travel specifications in which profiles of the target driving force that are set with respect to a traveling speed and an accelerator pedal position are different, and
   a time constant of the first-order lag process is set smaller as the target driving force set with respect to the traveling speed increases in the travel specifications.

4. The method for controlling a hybrid vehicle according to claim 1, wherein the electric motor is controlled based on the target driving force which is not subjected to the first-order lag process.

5. The method for controlling a hybrid vehicle according to claim 1, wherein
   the vehicle further comprises a battery that supplies power to the electric motor, and
   when required power corresponding to the target driving force is insufficient with the power supplied from the battery to the electric motor, power including the insufficient power is supplied from the generator to the electric motor.

6. A method for controlling a hybrid vehicle comprising an electric motor that drives the vehicle to travel, a generator that supplies power to the electric motor, and an engine that drives the generator, the method comprising:
   calculating a target driving force for the vehicle, an amount or factor of change in the target driving force for the vehicle, a pseudo driving force, and a latch value of the pseudo driving force,
   wherein the pseudo driving force is obtained by subjecting the target driving force to a first-order lag process,
   wherein the latch value of the pseudo driving force is a value of the pseudo driving force at a specific time point when the amount or factor of change in the target driving force increases, caused by an operation from a driver, to exceed a predetermined value;
   performing a first control before the specific time point, when the amount or factor of change in the target driving force is less than a predetermined threshold, to control a rotational speed of the engine in accordance with the target driving force by setting a change rate of a rotational speed of the engine in accordance with the amount or factor of change in the target driving force;
   performing a second control, from the specific time point until a second predetermined time elapses, to control the rotational speed of the engine in accordance with the pseudo driving force and the latch value of the pseudo driving force, and
   when performing the second control, controlling a rotational speed of the engine by setting the change rate of the rotational speed of the engine based on an achievement rate;

wherein the achievement rate is calculated based on a ratio of a difference between the pseudo driving force and the latch value of the pseudo driving force versus a difference between the target driving force and the latch value of the pseudo driving force; and controlling, after the second predetermined time has elapsed, the rotational speed of the engine based on a predetermined constant engine rotational speed change rate.

7. The method for controlling a hybrid vehicle according to claim 6, wherein when the change rate of the rotational speed of the engine is set in accordance with the amount or factor of change in the target driving force, the change rate of the rotational speed of the engine is set higher as the amount or factor of change in the target driving force increases.

8. The method for controlling a hybrid vehicle according to claim 6, wherein
the vehicle further comprises a battery that supplies power to the electric motor, and
when required power corresponding to the target driving force is insufficient with the power supplied from the battery to the electric motor, power including the insufficient power is supplied from the generator to the electric motor.

9. A device for controlling a hybrid vehicle comprising an electric motor that drives the vehicle to travel, a generator that supplies power to the electric motor, and an engine that drives the generator,
the device operating to:
calculate a target driving force for the vehicle, an amount or factor of change in the target driving force, a pseudo driving force, and a latch value of the pseudo driving force,
wherein the pseudo driving force is obtained by subjecting the target driving force to a first-order lag process,
wherein the latch value of the pseudo driving force is a value of the pseudo driving force at a specific time point when the amount or factor of change in the target driving force increases, caused by an operation from a driver, to exceed a predetermined value;
perform a first control before the specific time point, when an amount or factor of change in the target driving force is less than a predetermined threshold, to control a rotational speed of the engine in accordance with the pseudo driving force;
perform a second control on and after the specific time point, when the amount or factor of change in the target driving force is equal to or more than the predetermined threshold, to control the rotational speed of the engine in accordance with the pseudo driving force and the latch value of the pseudo driving force; and when performing the second control, controlling a rotational speed of the engine based on a change rate of the rotational speed of the engine correlated with an achievement rate;
wherein the achievement rate is calculated based on a ratio of a difference between the pseudo driving force and the latch value of the pseudo driving force versus a difference between the target driving force and the latch value of the pseudo driving force.

10. A device for controlling a hybrid vehicle comprising an electric motor that drives the vehicle to travel, a generator that supplies power to the electric motor, and an engine that drives the generator,
the device operating to:
calculate a target driving force for the vehicle, an amount or factor of change in the target driving force for the vehicle, a pseudo driving force, and a latch value of the pseudo driving force,
wherein the pseudo driving force is obtained by subjecting the target driving force to a first-order lag process,
wherein the latch value of the pseudo driving force is a value of the pseudo driving force at a specific time point when the amount or factor of change in the target driving force increases, caused by an operation from a driver, to exceed a predetermined value;
performing a first control before the specific time point, when the amount or factor of change in the target driving force is less than a predetermined threshold, to control a rotational speed of the engine in accordance with the target driving force by setting a change rate of a rotational speed of the engine in accordance with the amount or factor of change in the target driving force;
perform a second control, from the specific time point until a second predetermined time elapses, to control the rotational speed of the engine in accordance with the pseudo driving force and the latch value of the pseudo driving force, and
when performing the second control, a rotational speed of the engine is controlled by setting the change rate of the rotational speed of the engine based on an achievement rate;
wherein the achievement rate is calculated based on a ratio of a difference between the pseudo driving force and the latch value of the pseudo driving force versus a difference between the target driving force and the latch value of the pseudo driving force; and
control, after the second predetermined time has elapsed, the rotational speed of the engine based on a predetermined constant engine rotational speed change rate.

* * * * *